(12) United States Patent
Jin et al.

(10) Patent No.: US 12,549,663 B2
(45) Date of Patent: Feb. 10, 2026

(54) ELECTRONIC DEVICE AND METHOD FOR DISPLAYING SCREEN THEREOF

(71) Applicant: SAMSUNG ELECTRONICS CO., LTD., Suwon-si (KR)

(72) Inventors: Seoyoung Jin, Suwon-si (KR); Jinik Kim, Suwon-si (KR); Namjoon Park, Suwon-si (KR); Jeonggwan Kang, Suwon-si (KR); Heejun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 491 days.

(21) Appl. No.: 18/080,121

(22) Filed: Dec. 13, 2022

(65) Prior Publication Data

US 2023/0254402 A1    Aug. 10, 2023

Related U.S. Application Data

(63) Continuation of application No. PCT/KR2022/018426, filed on Nov. 21, 2022.

(30) Foreign Application Priority Data

Feb. 8, 2022    (KR) .................. 10-2022-0016445
May 6, 2022    (KR) .................. 10-2022-0056262

(51) Int. Cl.
    *H04M 1/72454*    (2021.01)
    *H04M 1/02*    (2006.01)

(52) U.S. Cl.
    CPC ..... *H04M 1/72454* (2021.01); *H04M 1/0216* (2013.01); *H04M 2201/38* (2013.01); *H04M 2201/42* (2013.01)

(58) Field of Classification Search
    CPC .......... H04M 1/72454; H04M 1/0216; H04M 2201/38; H04M 2201/42
    (Continued)

(56) References Cited

U.S. PATENT DOCUMENTS 8,300,065 B2    10/2012    Kim et al.
8,866,734 B2    10/2014    Lee et al.
(Continued)

FOREIGN PATENT DOCUMENTS

CN    110457885 A    11/2019
JP    10-0580174    5/2006
(Continued)

OTHER PUBLICATIONS

PCT International Search Report dated Feb. 20, 2023 for PCT/KR2022/018426.
(Continued)

*Primary Examiner* — Michael R Neff
(74) *Attorney, Agent, or Firm* — NIXON & VANDERHYE P.C.

(57) ABSTRACT

An electronic device may include a sensor; a display; and a processor operatively connected to the sensor and the display, wherein the processor may be configured to determine the feature of a context included in a user interface (UI) component on the basis of an analysis result of the UI component, determine a display direction of the contents displayed on the display on the basis of the feature of the context and the posture of the electronic device, identify a rotation angle of the electronic device through a sensor in accordance with a change in the posture of the electronic device in a state that the contents are displayed on the display, and change the display direction of the contents on the basis of identifying that the rotation angle is equal to or
(Continued)

greater than a first value. The first value may be configured differently in accordance with the feature of the context.

20 Claims, 17 Drawing Sheets

(58) Field of Classification Search
USPC ........................................................ 455/575.3
See application file for complete search history.

(56) References Cited

U.S. PATENT DOCUMENTS

| | | | |
|---|---|---|---|
| 11,250,544 B2 | 2/2022 | Jang et al. | |
| 11,379,175 B2 | 7/2022 | Lim et al. | |
| 11,422,609 B2 | 8/2022 | Na et al. | |
| 2013/0257909 A1* | 10/2013 | Nagata | G09G 5/38 345/650 |
| 2014/0009389 A1* | 1/2014 | Sugiura | G06F 1/1694 345/156 |
| 2016/0091606 A1 | 3/2016 | Shin et al. | |
| 2018/0356904 A1* | 12/2018 | Disano | G06F 3/0488 |
| 2020/0293093 A1* | 9/2020 | Kim | G06F 1/1677 |
| 2022/0291818 A1 | 9/2022 | Lee et al. | |

FOREIGN PATENT DOCUMENTS

| | | |
|---|---|---|
| JP | 5315902 | 10/2013 |
| JP | 2014-045263 | 3/2014 |
| JP | 6043674 | 12/2016 |
| JP | 6043674 B2 | 12/2016 |
| JP | 10-1737829 | 5/2017 |
| KR | 10-1333407 B1 | 11/2013 |
| KR | 10-2018-0068927 A | 6/2018 |
| KR | 10-2019-0017614 A | 2/2019 |
| KR | 10-2020-0108760 A | 9/2020 |
| KR | 10-2021-0073912 A | 6/2021 |
| WO | WO 2023/153595 A1 | 8/2023 |

OTHER PUBLICATIONS

Notification of Publication dated Aug. 17, 2023 for PCT/KR2022/018426.
Extended European Search Report dated Jan. 30, 2025 for EP Application No. 22926193.8.
Cheng, L. P., et al. (May 2012). iRotate: Automatic screen rotation based on face orientation. In Proceedings of the SIGCHI conference on human factors in computing systems, May 2012.
Indian Office action dated Sep. 22, 2025 for Indian Application No. 202447057011.

* cited by examiner

ELECTRONIC DEVICE AND METHOD FOR DISPLAYING SCREEN THEREOF

CROSS-REFERENCE TO RELATED APPLICATIONS

This application is a continuation of International Application No. PCT/KR2022/018426 filed on Nov. 21, 2022, designating the United States, in the Korean Intellectual Property Receiving Office, and claiming priority to KR 10-2022-0016445, filed Feb. 8, 2022, and to KR 10-2022-0056262, filed May 6, 2022, the disclosures of which are all hereby incorporated by reference herein in their entireties.

BACKGROUND

Field

Certain example embodiments relate to an electronic device, for example, to a device and a method for controlling screen rotation in an electronic device.

Description of Related Art

Portable electronic devices, which have become a necessity for people of today because of their ease of portability, are developing into multimedia devices that provide various services such as voice and video call functions, information input/output functions, and data storage. Furthermore, the portable electronic device may provide efficiently various multimedia services by increasing a display area using a touch screen.

Display area of the portable electronic device may be constituted in a rectangular shape having different horizontal and vertical lengths. Accordingly, the portable terminal may provide a screen rotation function to increase the efficiency of multimedia services.

Display rotation function may indicate a function of rotating the display direction of the display area in consideration of the rotation direction of the portable electronic device. For example, in the case that the portable terminal is rotated by 90° clockwise, the portable terminal may display by rotating the display direction of the display area by 90° counterclockwise.

SUMMARY

As described above, the portable electronic device may provide a screen rotation function in consideration of the rotation direction of the portable electronic device. Accordingly, the portable electronic device may cause inconvenience in that the display direction of the display area is rotated in a situation not intended by the user.

The electronic device may calculate an angle change of the electronic device using at least an inertial sensor so that the direction of the screen viewed by the user does not substantially deviate from the direction of the displayed screen, calculate the rotation direction of the electronic device on the basis of the angle change value, and rotate the screen based on the rotation direction of the electronic device.

However, since this screen rotation method determines whether to rotate the screen on the basis of, e.g., only, the quantitative amount of physical change and does not necessary have to (although it may) consider the usability of the context displayed on the actual screen, it need not match the actual use situation.

Here, the context may indicate constitution information about the execution state of a task in the case that a task is performed within the operating system. The usability of the context may indicate a method in which the context is used on the electronic device. For example, the electronic device may display a message on the screen and in this case the context may be or include a text. For a page including many texts, the electronic device may be used vertically in relatively more cases than horizontally because of the advantage of content grasp and the ease of typing. In this case, the electronic device may define the usability of the context of a page including many texts as a vertical direction.

In the case of determining whether to rotate the screen on the basis of, e.g., only, the quantitative amount of physical change, the user may feel uncomfortable as the usability of the context displayed on the electronic device is not taken into consideration and the screen may be displayed differently from the user's intended screen direction.

However, the problems to be solved in the present disclosure are not limited to the above-mentioned problems and may be expanded in various ways without departing from the spirit and scope.

An electronic device according to various example embodiments may include a sensor; a display; and a processor operatively connected to the sensor and the display, wherein the processor may be configured to determine the feature of a context included in a user interface (UI) component on the basis of an analysis result of the UI component, determine a display direction of contents displayed on the display on the basis of the feature of the context and the posture of the electronic device, identify a rotation angle of the electronic device via at least a sensor in accordance with a change in the posture of the electronic device in a state that the contents are displayed on the display, and change the display direction of the contents based on identifying that the rotation angle is equal to or greater than a first value. The first value may be set differently in accordance with the feature of the context.

A method of displaying a screen of an electronic device according to various example embodiments may include an operation of determining the feature of the context included in a UI component on the basis of an analysis result of the UI component, an operation of determining a display direction of contents displayed on the display based on the feature of the context and the posture of the electronic device, an operation of identifying a rotation angle of the electronic device through a sensor in accordance with a change in the posture of the electronic device in a state that the contents are displayed on the display, and an operation of changing the display direction of the contents on the basis of identifying that the rotation angle is equal to or greater than a first value. The first value may be configured differently in accordance with the feature of the context.

According to various example embodiments, the electronic device may provide a convenient usability as the screen is rotated in the same direction as the user intended in the case that the user rotates, or changes the location of, the electronic device by determining whether to rotate the screen on the basis of the usability of the context to be displayed.

According to various example embodiments, the electronic device, by determining whether to rotate the screen on the basis of the usability of a context to be displayed, may overcome the limitation of not reflecting the user's intention in a situation where the actual display is used in the case of determining whether to rotate the screen on the basis of, e.g., only, the quantitative amount of physical change by the inertial sensor.

In addition, it is possible to provide various effects that are directly or indirectly identified through this document.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
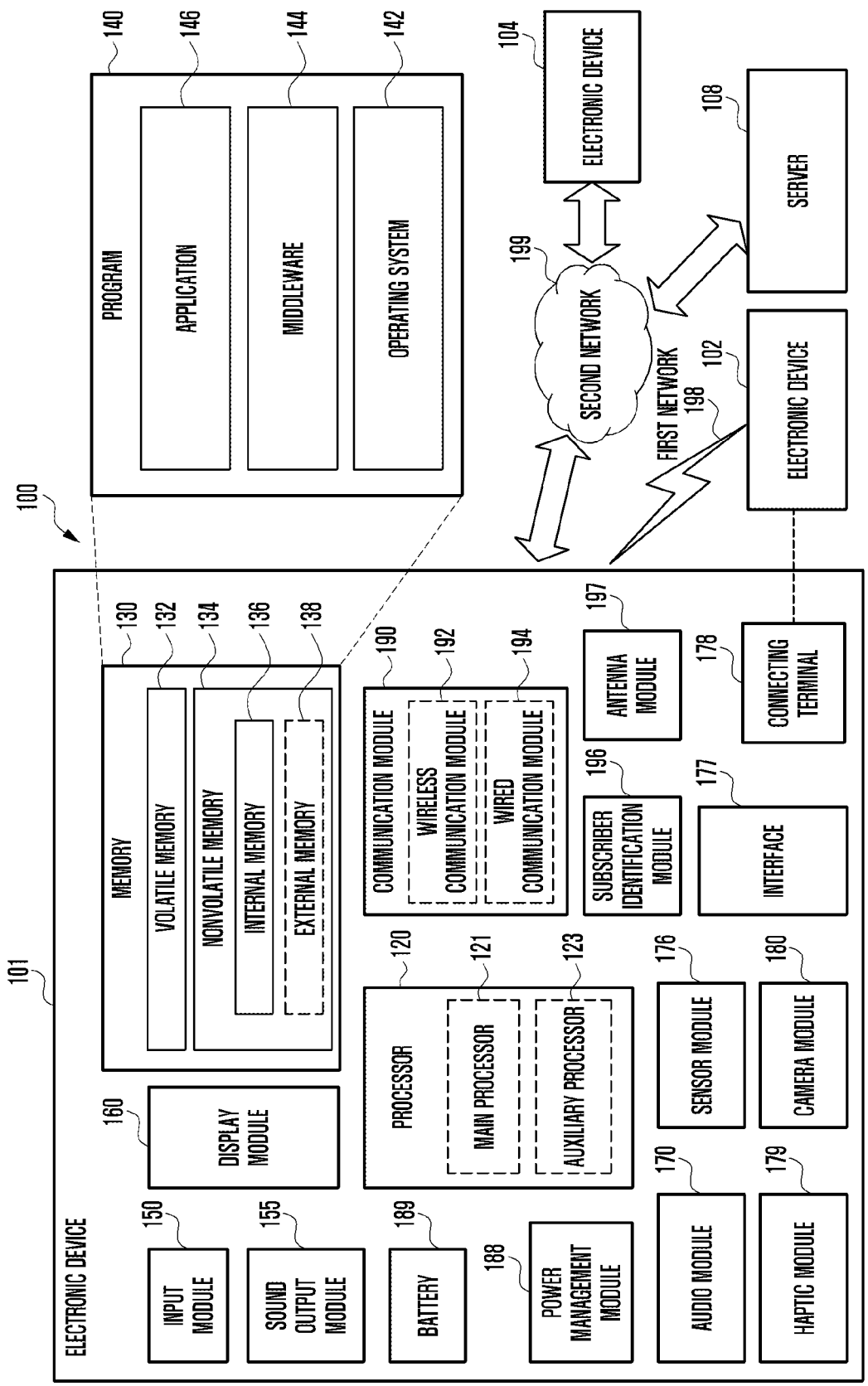
FIG. 1 is a block diagram of the electronic device in the network environment according to an example embodiment.

FIG. 1 is a block diagram illustrating an electronic device 101 in a network environment 100 according to various embodiments. With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

The electronic device according to various embodiments may be one of various types of electronic devices. The electronic devices may include, for example, a portable communication device (e.g., smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., the first element) is referred to, with or without the term "operatively" or "communicatively", as "coupled with", "coupled to", "connected with", or "connected to" another element (e.g., the second element), it means that the element may be coupled with the other element directly (e.g., wiredly), wirelessly, or via at least the third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program or another component may be carried out sequentially, in parallel, repeatedly, or heuristically, or one or more of the operations may be executed in a different order or omitted, or one or more other operations may be added.

Figure 2A:
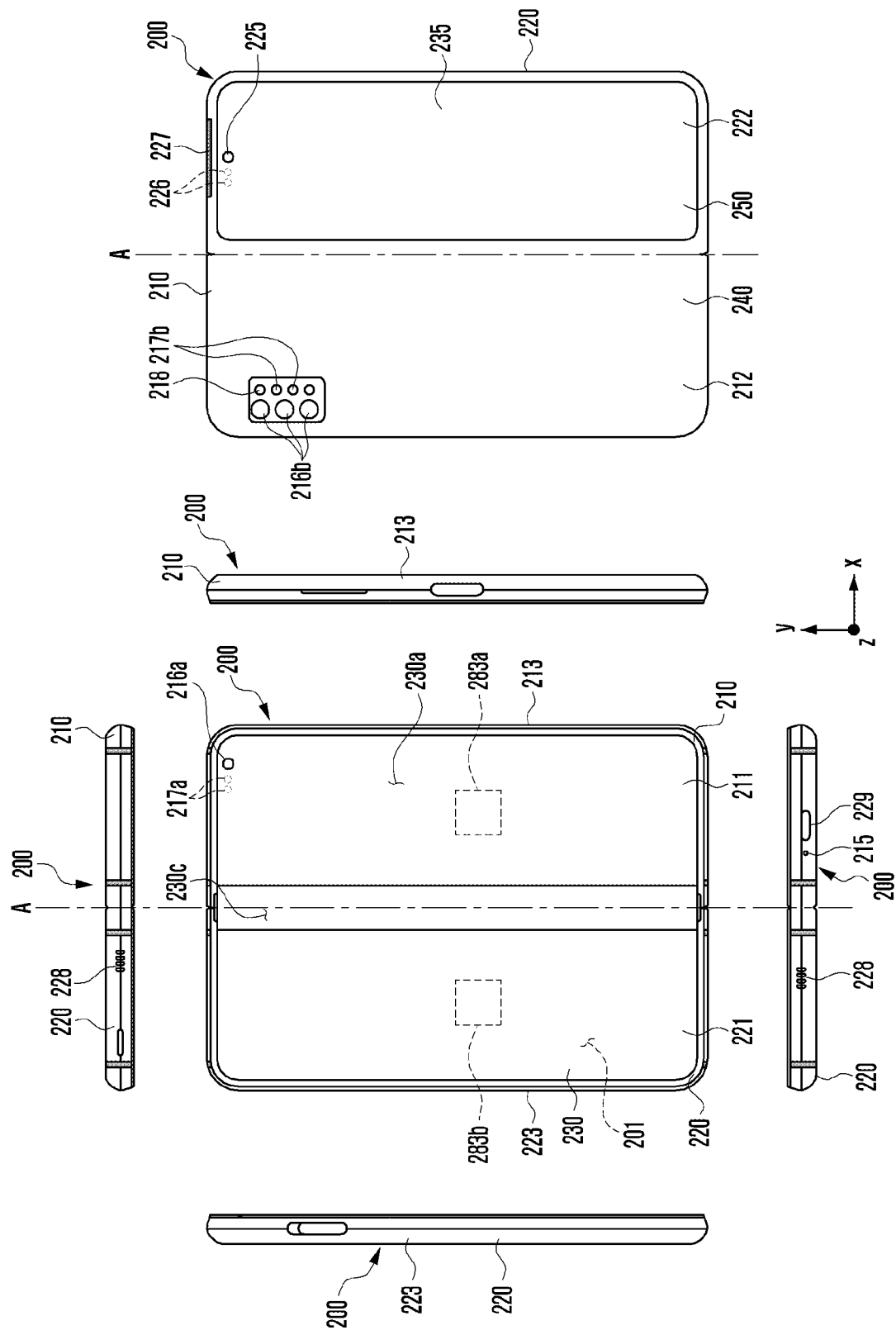
FIG. 2a is a diagram illustrating an unfolded state of the electronic device according to various example embodiments.
Figure 2B:
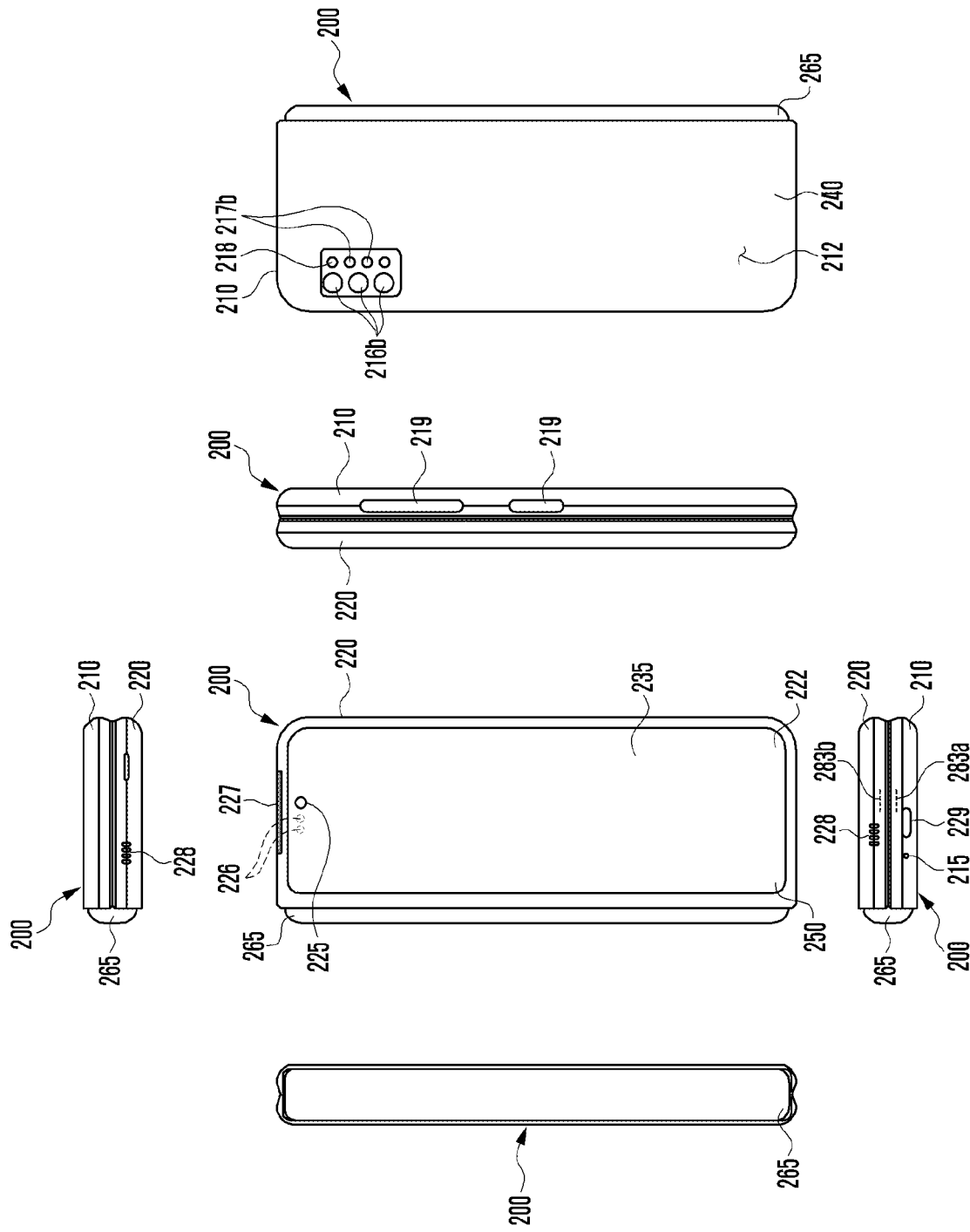
FIG. 2b is a diagram illustrating a folded state of the electronic device 200 according to various example embodiments.
Figure 2C:
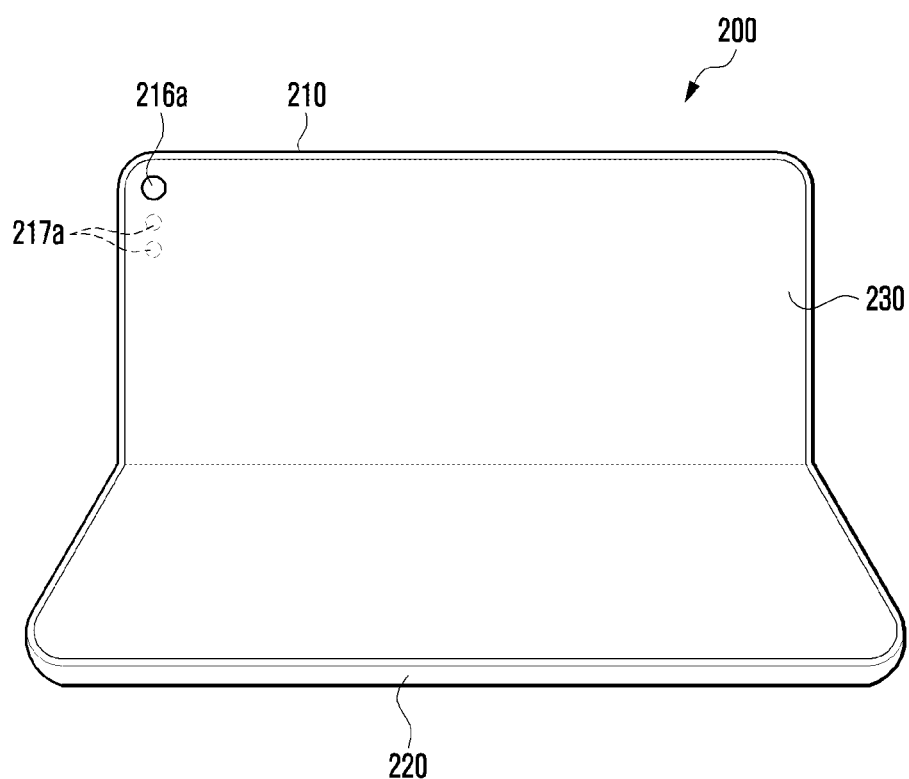
FIG. 2c is a diagram illustrating an intermediate state of the electronic device 200 according to various example embodiments.

FIG. 2a is a diagram illustrating an unfolding state of an electronic device (e.g., a foldable electronic device) according to various embodiments of the present disclosure. FIG. 2b is a diagram illustrating a folding state of an electronic device according to various embodiments of the present disclosure. FIG. 2c is a diagram schematically illustrating an exploded perspective view of an electronic device according to various embodiments of the present disclosure.

According to various embodiments, the embodiments shown in FIGS. 1a and 1b may be included in the embodiments shown in FIGS. 2a to 2c. For example, the electronic device 200 illustrated in FIGS. 2a to 2c may include the processor 120 illustrated in FIG. 1a, the memory 130, the input module 150, the sound output module 155, the display module 160, the audio module 170, the sensor module 176, the interface 177, the connection terminal 178, the haptic module 179, the camera module 180, the antenna module 197 comprising at least one antenna, and/or the subscriber identification module 196. The electronic device disclosed in FIGS. 2a to 2c may include a foldable electronic device 200.

With reference to FIGS. 2a to 2c, the foldable electronic device 200 according to various embodiments of the present disclosure may include a pair of housings (e.g., the first housing 210 and the second housing 220) (e.g., a foldable housing) to be folded while facing each other on the basis of a hinge cover 265. According to an embodiment, the foldable electronic device 200 may include a hinge cover (e.g., the hinge cover 265 of FIG. 2b) that covers foldable portions of a pair of housings (e.g., the first housing 210 and the second housing 220) and a flexible display 230 (e.g., a foldable display) disposed in a space formed by a pair of housings (e.g., the first housing 210 and the second housing 220).

According to various embodiments, the flexible display 230 disposed in a space formed by a pair of housings (e.g., the first housing 210 and the second housing 220) may include one display or at least two displays.

According to various embodiments, the surface on which the flexible display 230 is disposed may be defined as the front surface (or the first surface) of the foldable electronic device 200, and the opposite surface of the front surface may be defined as the rear surface (or the second surface) of the foldable electronic device 200. A surface surrounding the space between the front surface and the rear surface may be defined as a side surface of the foldable electronic device 200.

According to various embodiments, the pair of housings (e.g., the first housing 210, the second housing 220) may include a first housing 210 that includes a sensor area 231d of FIG. 2a, a second housing 220, a first back cover 240, and a second back cover 250. The pair of housings 210 and 220 of the foldable electronic device 200 are not limited to the shape and combination shown in FIGS. 2a and 2c, and they may be implemented by a combination and/or coupling of other shapes or parts. For example, in another embodiment, the first housing 210 and the first back cover 240 may be integrally formed, and the second housing 220 and the second back cover 250 may be integrally formed.

According to various embodiments, the first housing 210 and the second housing 220 may be disposed on opposite sides centered on the folding axis (A axis), and they may have a symmetrical shape as a whole with respect to the folding axis (A axis). According to an embodiment, the first housing 210 and the second housing 220 may have different angles or distances formed from each other depending on whether the foldable electronic device 200 is in an unfolded (unfolding or flat) state, a folded (folding) state, or an intermediate state. According to an embodiment, the first housing 210 may additionally include a sensor area 231d in which various sensors are disposed, unlike the second housing 220, but it may have a mutually symmetrical shape in other areas. According to an embodiment, the sensor area 231d of FIG. 2a may be additionally disposed at or replaced with at least a partial area of the second housing 220. According to an embodiment, the first housing 210 and the second housing 220 may have an asymmetrical shape with respect to the folding axis (A). For example, in the case that the electronic device 200 is in a folded state, the first housing 210 and the second housing 220 may also be folded in an asymmetrical form centered on the folding axis (A) so that a portion of the flexible display 230 may be exposed/viewable to the outside of the electronic device 200.

According to various embodiments, the first housing 210 may be connected, directly or indirectly, to a hinge cover 265 of FIG. 2b in an unfolded state of the foldable electronic device 200, and it may include a first surface 211 disposed to face the front side of the foldable electronic device 200, a second surface 212 facing the opposite direction of the first surface 211, and the first side member 213 surrounding at least a portion of the space between the first surface 211 and the second surface 212. According to an embodiment, the first side member 213 may include a first side surface 213*a* of FIG. 2*a* disposed parallel to the folding axis (A axis), a second side surface 213*b* of FIG. 2*a* extended from one end of the first side surface 213*a* in a direction perpendicular to the folding axis (A axis), and a third side surface 213*c* of FIG. 2*a* extended from the other end of the first surface 213*a* in a direction perpendicular to the folding axis (A axis).

According to various embodiments, the second housing 220 may be connected, directly or indirectly, to a hinge cover 265in an unfolded state of the electronic device 200, and it may include the third surface 221 disposed to face the front of the foldable electronic device 200, the fourth surface 222 facing the opposite direction to the third surface 221, and the second side member 223 surrounding at least a portion of the space between the third surface 221 and the fourth surface 222. According to an embodiment, the second side member 223 may include a fourth side surface 223*a* of FIG. 2*a* disposed in parallel to the folding axis (A axis), a fifth side surface 223*b* of FIG. 2*a* extended from one end of the fourth side surface 223*a* in a direction perpendicular to the folding axis (A axis), and a sixth side surface 223*c* extended from the other end of the fourth side surface 223*a* in a direction perpendicular to the folding axis (A axis). According to an embodiment, the third surface 221 may face with the first surface 211 in a folded state.

According to various embodiments, the foldable electronic device 200 may include a recess 201 formed to accommodate the flexible display 230 through structural coupling of the first housing 210 and the second housing 220. The recess 201 may have substantially the same size as the flexible display 230. According to an embodiment, due to the sensor area 231*d*, the recess 201 may have two or more different widths in a direction perpendicular to the folding axis (A axis). For example, the recess 201 may have the first width between the first portion 220*a* of FIG. 2*a* of the second housing 220 and the first portion 210*a* formed at the edge of the sensor region 231*d* of the first housing 210, and the second width (W2) formed by the second portion 220*b* of FIG. 2*a* of the second housing 220 and the second portion 210*b* that is not part of sensor area 231*d* of the first housing 210 and parallel to the folding axis (A axis). In this case, the second width may be formed to be longer than the first width (W1). For example, the recess 201 may be formed to have a first width (W1) formed from the first portion 210*a* of the first housing 210 having a mutually asymmetrical shape to the first portion 220*a* of the second housing 220, and it may be formed to have a second width (W2) formed from the second portion 210*b* of the first housing 210 having a mutually symmetrical shape to the second portion 220*b* of the second housing 220. According to an embodiment, the first part 210*a* of FIG. 2*a* and the second part 210*b* of FIG. 2*a* of the first housing 210 may be formed to have different distances from the folding axis (A axis). The width of the recess 201 may not be limited to the illustrated example. According to various embodiments, the recess 201 may have two or more different widths due to the shape of the sensor area 231*d* or the portion having the asymmetrical shape of the first housing 210 and the second housing 220.

According to various embodiments, at least a portion of the first housing 210 and the second housing 220 may be formed of a metal material or a non-metal material having rigidity to support the flexible display 230.

According to various embodiments, the sensor area 231*d* may be formed to have a preset area adjacent to one corner of the first housing 210. According to various embodiments of the present disclosure, the sensor area 231*d* may be disposed under the flexible display 230 or disposed inside the flexible display 230 so as not to be exposed to the outside of the electronic device 200. The arrangement, shape, or size of the sensor area 231*d* may not be limited to the illustrated example. For example, the sensor area 231*d* may be provided at another corner or any arbitrary area between the upper corner and the lower corner of the first housing 210. According to an embodiment, the sensor area 231*d* of FIG. 2*a* may be disposed in at least a partial area of the second housing 220. The sensor area 231*d* may be disposed to extend to the first housing 210 and the second housing 220. According to an embodiment, the foldable electronic device 200 may include various components arranged to be exposed on the front side of the foldable electronic device 200 through the sensor area 213*d* of FIG. 2*a* or through one or more openings provided in the sensor area 231*d*. According to various embodiments, the various components may include, for example, at least one of a front camera device, a receiver, a proximity sensor, an illuminance sensor, an iris recognition sensor, an ultrasonic sensor, and an indicator.

According to various embodiments, the first back surface cover 240 may be disposed on the second surface 212 of the first housing 210 and may have a substantially rectangular periphery. According to an embodiment, at least a portion of the edge may be surrounded by the first housing 210. The second back surface cover 250 may be disposed on the fourth surface 222 of the second housing 220, and at least a portion of an edge thereof may be surrounded by the second housing 220.

According to various embodiments, the first rear surface cover 240 and the second rear surface cover 250 may have a substantially symmetrical shape with respect to the folding axis (A axis). The first back surface cover 240 and the second back surface cover 250 may include a variety of different shapes. According to an embodiment, the first back surface cover 240 may be integrally formed with the first housing 210, and the second rear surface cover 250 may be integrally formed with the second housing 220.

According to various embodiments, the first back surface cover 240, the second back surface cover 250, the first housing 210, and the second housing 220 may provide a space, through a structure coupled to each other, in which various components (e.g., a printed circuit board, an antenna module (e.g., the antenna module 197 of FIG. 1*a*, including at least one antenna), a sensor module (e.g., the sensor module 176 of FIG. 1*a*, including at least one sensor), or a battery (e.g., the battery 189 of FIG. 1*a*)) of the foldable electronic device 200 may be disposed. According to an embodiment, one or more components may be disposed or visually exposed/viewable on the rear surface of the foldable electronic device 200. For example, one or more components or sensors may be visually exposed through the first rear surface area 241 of FIG. 2*b* of the first back surface cover 240. According to an embodiment, the sensor may include a proximity sensor, a rear camera device, and/or a flash. According to an embodiment, at least a portion of the sub-display 252 may be visually exposed/viewable through the second rear surface area 251 of FIG. 2*b* of the second back surface cover 250. The sub-display 252 of FIG. 2b may be disposed over the entire fourth surface 222 of the second back surface cover 250.

According to various embodiments, the flexible display 230 (e.g., the display module 160 of FIG. 1a, including a display) may be disposed in a space formed by a pair of housings (e.g., the first housing 210 and the second housing 220). For example, the flexible display 230 may be seated in a recess 201 formed by a pair of housings 210 and 220, and it may be placed to occupy most of the front surface of the foldable electronic device 200. According to an embodiment, the front surface of the foldable electronic device 200 may include a flexible display 230, a partial area (e.g., an edge area) of the first housing 210, and a partial area (e.g., an edge area) of the second housing 220 that are adjacent to the flexible display 230. According to an embodiment, the rear surface of the foldable electronic device 200 may include a first back cover 240, a partial area (e.g., an edge area) of the first housing 210 adjacent to the first back surface cover 240, a second back surface cover 250, and a partial area (e.g., an edge area) of the second housing 220 adjacent to the second back cover 250.

According to various embodiments, the flexible display 230 may be or include a display in which at least a partial area may be deformed into a flat surface or a curved surface. According to an embodiment, the flexible display 230 may include a bending area 230c (e.g., a folding area), a first planar area 230a disposed on one side (e.g., a right area of the bending area 230c) with respect to the bending area 230c, and a second planar area 231b disposed on the other side (e.g., a left area of the folding area 230c). For example, the first planar area 231a may be disposed on the first surface 211 of the first housing 210, and the second planar area 231b of FIG. 2b is disposed on the third surface 221 of the second housing 220. According to an embodiment, the division of areas of the flexible display 230 is exemplary, and the flexible display 230 may be divided into a plurality (e.g., two or four or more) of areas according to a structure or function. According to an embodiment, in the embodiment shown in FIG. 2a, the area of the flexible display 230 may be divided by the bending area 231c extending parallel to the y-axis or the folding axis (A-axis), but the flexible display 230 may also be divided into areas on the basis of another bending area (e.g., a folding area parallel to the x-axis) or another folding axis (e.g., a folding axis parallel to the x-axis). According to an example embodiment, the division of the area of the flexible display 230 is only a physical division by a pair of housings 210 and 220 and a hinge cover 265, and substantially one full screen may be displayed on the flexible display 230 through a pair of housings 210 and 220 and a hinge module (e.g., the hinge module 264 of FIG. 2b). According to an embodiment, the first planar area 230a and the second planar area 231b may have an overall symmetrical shape with respect to the bending area 230c. According to an embodiment, the first planar area 230a, unlike the second planar area 231b, may be a notch area cut according to the presence of the sensor area 231d, but it may have a symmetrical shape to the second planar area 231b in other areas. For example, the first planar area 230a and the second planar area 231b may include a portion having a shape symmetrical to each other and a portion having a shape asymmetrical to each other. According to an embodiment, in the case that the sensor area 231d is disposed below (e.g., −Z direction) the flexible display 230 or disposed inside the flexible display 230, the first planar area 230a and the second planar area 231b may have a substantially symmetrical shape with respect to the bending area 230c, in accordance with the notch area 233 being omitted.

With reference to FIG. 2b, the foldable electronic device 200 may include a hinge cover 265. The hinge cover 265 may be disposed between the first housing 210 and the second housing 220, and it may be configured to cover an internal component (e.g., the hinge cover 265 of FIG. 2b). According to an embodiment, the hinge cover 265 may be covered by a part of the first housing 210 and the second housing 220 or exposed to the outside in accordance with an operating state (e.g., the unfolding state or the folding state) of the foldable electronic device 200. For example, the hinge cover 265 may be disposed so that it may support a hinge module (e.g., the hinge module 264 of FIG. 2b), be exposed to the outside in the case that the foldable electronic device 200 is in a folded state, and, in an unfolded state, be substantially invisible from the outside by being disposed in the first space (e.g., the internal space of the first housing 210) and the second space (e.g., the internal space of the second housing 220).

According to various embodiments, as shown in FIG. 2a, in the case that the foldable electronic device 200 is in an unfolded state, the hinge cover 265 may not be exposed by being covered by the first housing 210 and the second housing 220. As shown in FIG. 2b, in the case that the foldable electronic device 200 is in a folded state, the hinge cover 265 may be exposed to the outside between the first housing 210 and the second housing 220. According to an embodiment, in the case that the first housing 210 and the second housing 220 are in an intermediate state that is folded with a certain angle, the hinge cover 265 may be at least partially exposed to the outside of the foldable electronic device 200. In this case, the exposed area may be smaller than that of the fully folded state of the foldable electronic device 200. According to an embodiment, the hinge cover 265 may include a curved space.

According to various embodiments, in the case that the foldable electronic device 200 is in an unfolded state (e.g., FIG. 2a), the first housing 210 and the second housing 220 substantially may form an angle of about 180°, and the first planar area 230a and the second planar area 231b of the display 230 may be disposed to face the same direction (e.g., horizontal). In this case, the bending area 230c may form substantially the same plane as the first planar area 230a and the second planar area 231b.

According to various embodiments, in the case that the foldable electronic device 200 is in a folded state (e.g., the state of FIG. 2b), the first housing 210 and the second housing 220 may be disposed to face each other. The first planar area 230a and the second planar area 231b of the flexible display 230 may face each other while forming a preset angle (e.g., between about 0° and 10°). In this case, at least a portion of the bending area 230c may be bent to have a preset curvature.

According to various embodiments, in the case that the foldable electronic device 200 is in an intermediate state, the first housing 210 and the second housing 220 may be disposed at a preset angle (e.g., between about 85° and about 95°) to each other. The first planar area 230a and the second planar area 231b of the flexible display 230 may form an angle larger than that in the folded state and smaller than that in the unfolded state. At least a portion of the bending area 230c may be bent to have a preset curvature. In this case, the curvature of the bending area 230c may be smaller than that in the folded state.

With reference to FIG. 2c, the electronic device 200 may be operated to maintain an intermediate state through a hinge module (e.g., the hinge cover 265 of FIG. 2b). According to an embodiment, the intermediate state is an operating state corresponding to the state between an unfolded state and a folded state of the first housing 210 and the second housing 220, and it may include an operating state in which the folding angle of the first housing 210 and the second housing 220 is included in the third reference range (e.g., about 20 degrees to about 170 degrees). According to an embodiment, the electronic device 200 may be operated to maintain the first housing 210 and the second housing 220 unfolded at various angles through a hinge module (e.g., the hinge cover 265 of FIG. 2b) in an intermediate state. For example, the unfolded state of the first housing 210 and the second housing 220 may include an operating status in which the folding angle of the first housing 210 and the second housing 220 is included in a first reference range (e.g., about 170 degrees to about 180 degrees). For example, the folded state of the first housing 210 and the second housing 220 may include an operating state in which the folding angle of the first housing 210 and the second housing 220 is in the second reference range (e.g., about 0 degrees to about 20 degrees).

According to an embodiment, the electronic device 200 may use the first display 230 or the second display 235 on the basis of the folding angle of the first housing 210 and the second housing 220. For example, in the case that the folding angles of the first housing 210 and the second housing 220 are included in a specified first range (e.g., about 20 degrees to about 75 degrees), the electronic device 200 may use the second display 235. For example, in the case that the folding angles of the first housing 210 and the second housing 220 are included in a specified second range (e.g., about 75 degrees to about 170 degrees), the electronic device 200 may use the first display 230. In this case, the electronic device 200 may control the first display 230 so that mutually different contents may be displayed on the first area of the first display 230 corresponding to the first surface 211 and the second area of the first display 230 corresponding to the third surface 221. For example, the designated first range and/or the designated second range may be included in the third reference range for determining the intermediate state.

Figure 3:
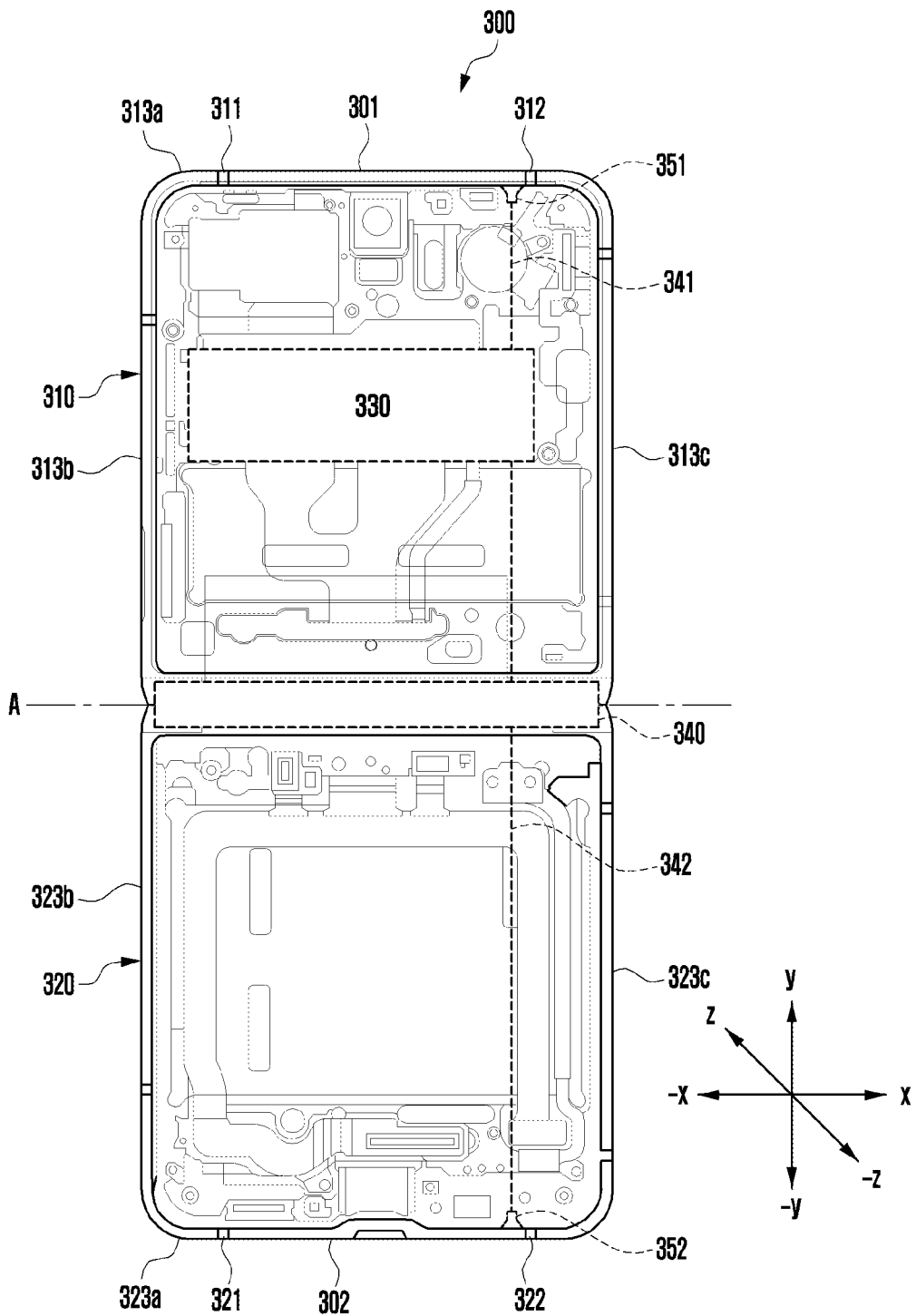
FIG. 3 is a plane view of an electronic device according to various embodiments.

FIG. 3 is a plane view of an electronic device according to various embodiments. For example, the electronic device 300 of FIG. 3 may be at least partially similar to the electronic device 101 of FIG. 1, or it may include other embodiments of the electronic device.

With reference to FIG. 3, an electronic device 300 according to various embodiments may include a first housing 310, a second housing 320, a first antenna 301, a second antenna 302, a printed circuit board 330, and a hinge module 340.

According to an embodiment, the first antenna 301 may be disposed at an end (e.g., the end in the +y direction) of the first housing 310, and the second antenna 302 may be disposed at an end (e.g., the end of the −y direction) of the second housing 320.

According to an embodiment, the first housing 310 may be coupled to at least a portion of the first side of the hinge module 340. The first housing 310 may include a first side surface 313a, a second side surface 313b extending from one end of the first side surface 313a in a folding axis (A axis) direction (e.g., the −y axis direction), and a third side surface 313c extending from the other end of the side surface 313a in a folding axis (A-axis) direction (e.g., the −y-axis direction). The first housing 310 may be configured to be foldable and unfordable with the second housing 320 centered on the folding axis (A axis) of the hinge module 340.

According to an embodiment, the second housing 320 may be coupled to at least a portion of the second side of the hinge module 340. The second housing 320 may include a fourth side surface 323a, a fifth side surface 323b extending from one end of the fourth side surface 323a in a folding axis (A axis) direction (e.g., the y axis direction), and a sixth side surface 323c extending from the other end of the fourth side surface 323a in a folding axis (A axis) direction (e.g., the y axis direction). The second housing 320 may be configured to be foldable and unfoldable with the first housing 310 centered on the folding axis (A axis) of the hinge module 340.

According to various embodiments, a flexible display 230 (e.g., at least one display 230 of FIG. 2a or FIG. 2b) may be disposed to be foldable and/or unfoldable in the first housing 310, the hinge module 340, and the upper portion of the second housing 320 (e.g., the −z-axis direction).

According to an embodiment, the hinge module 340 may be disposed between the first housing 310 and the second housing 320, and the first housing 310 and the second housing 320 may be configured to be rotatable. The hinge module 340 may be disposed so that the first housing 310 and the second housing 320 may be in a folded state and/or an unfolded state on the basis of the folding axis (A axis). The hinge module 340 may have a first side coupled to at least a portion of the first housing 310 and a second side coupled to at least a portion of the second housing 320.

According to an embodiment, the first antenna 301 may be disposed between the first segmentation portion 311 and the second segmentation portion 312 formed on the first side surface 313a of the first housing 310. The first antenna 301 may be electrically connected to the processor (e.g., the processor 120 of FIG. 1) and a power supply control unit (not shown) disposed on the printed circuit board 330. The first antenna 301 may transmit/receive a signal of a designated first frequency band.

According to various embodiments, the first antenna 301 may include a first feeding point 351 integrally coupled therein. The first feeding point 351 may be electrically connected to the first signal connection member 341 connected to the printed circuit board 330. For example, the first signal connection member 341 may include one of a coaxial cable, a flexible printed circuit board (FPCB), and an FPCB type RF cable (FRC).

According to an embodiment, the second antenna 302 may be disposed between the third segmentation portion 321 and the fourth segmentation portion 322 formed on the fourth side surface 323a of the second housing 320. The second antenna 302 may be electrically connected to the processor 120 and a power supply control unit (not shown) disposed on the printed circuit board 330. The second antenna 302 may transmit/receive a signal of a designated second frequency band.

According to various embodiments, the second antenna 302 may include a second feeding point 352 integrally coupled therein. The second feeding point 352 may be electrically connected, directly or indirectly, to the second signal connection member 342 connected, directly or indirectly, to the printed circuit board 830. The second signal connection member 342 may include one of a coaxial cable, a flexible printed circuit board (FPCB), and an FPCB type RF cable (FRC).

According to various embodiments, the printed circuit board 330 may be electrically connected, directly or indirectly, to the first feeding point 351 of the first antenna 301 using the first signal connection member 341. The first feeding point 351 may supply power to the first antenna 301.

According to various embodiments, the printed circuit board 330 may be electrically connected, directly or indirectly, to the second feeding point 352 of the second antenna 302 using the second signal connection member 342. The second feeding point 352 may supply power to the second antenna 302.

According to an embodiment, a sensor module (e.g., the sensor module 176 of FIG. 1) may detect whether the first housing 310 and the second housing 320 are in an unfolding state or a folding state on the basis of the hinge module 340 of the electronic device 300. The sensor module 176 may transmit to the processor 120 a detection signal corresponding to the unfolded state or the folded state of the first housing 310 and the second housing 320. Each "module" herein may comprise circuitry.

Figure 4A:
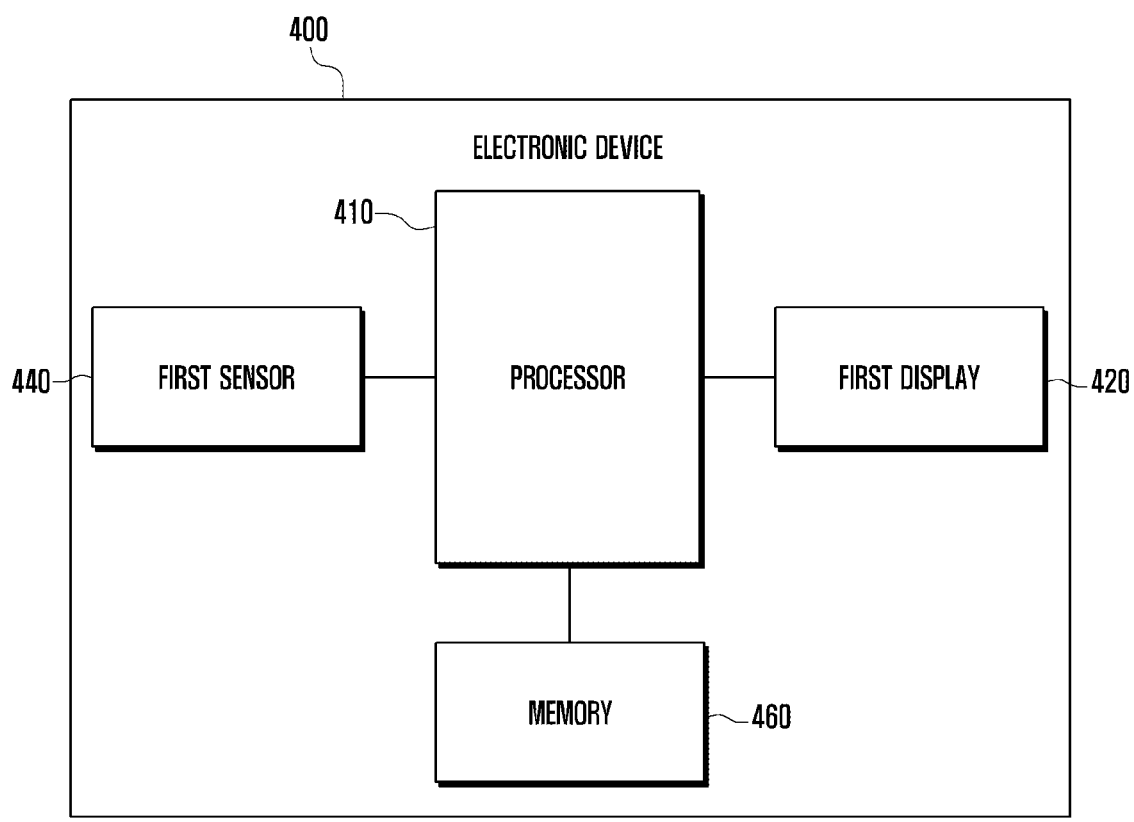
FIGS. 4a and 4b are block diagrams of an electronic device for controlling screen rotation according to various example embodiments.

FIG. 4a is a block diagram of an electronic device for controlling screen rotation according to various embodiments. According to an embodiment, the electronic device 400 of FIG. 4a may be at least partially similar to at least one of the electronic device 101 of FIG. 1, the electronic device 200 of FIGS. 2a to 2c, or the electronic device 300 of FIG. 3, or it may further include other embodiments of the electronic device.

According to various embodiments, the electronic device 400 may include a processor 410, a first display 420, a first sensor 440, and/or a memory 460. According to an embodiment, the processor 410 may be substantially the same as the processor 120 of FIG. 1, or it may be included in the processor 120. The first display 420 may be substantially the same as the display module 160 of FIG. 1, or it may be included in the display module 160. The first sensor 440 may be substantially the same as the sensor module 176 of FIG. 1, or it may be included in the sensor module 176. The memory 460 may be substantially the same as the memory 130 of FIG. 1, or it may be included in the memory 130. Each processor herein comprises processing circuitry.

According to an embodiment, the first display 420 may be substantially the same as the first display 230 of FIG. 2a, or it may be included in the first display 230. The first sensor 440 may be substantially the same as the first inertial sensor 283a of FIG. 2a, or it may be included in the first inertial sensor 283a.

According to various embodiments, the first display 420 may display information processed by the electronic device 400. According to an embodiment, the first display 420 may display a content related to an application program executed by the processor 410. According to an embodiment, in the case that the electronic device 400 operates in a sleep mode, the first display 420 may display a content related to a low-power display mode (e.g., always on display (AOD)). For example, the standby mode of the electronic device 400 may include a state in which driving of the processor 410 (e.g., an application processor) is restricted.

According to various embodiments, the first sensor 440 may be disposed in at least a portion of an internal space of the first housing of the electronic device 400 (e.g., the first housing 210 of FIG. 2a). According to an embodiment, the first sensor 440 may collect and provide static information (e.g., the posture of the electronic device 400) of the first housing (e.g., the first housing 210 of FIG. 2a) or information related to movement (e.g., angular velocity and/or acceleration) to the processor 410. For example, the first sensor 440 may include an inertial sensor, a motion sensor, a 6-axis sensor, a first gyro sensor, and/or a first acceleration sensor.

According to various embodiments, the processor 410 may control the operatively connected first display 420 and/or the first sensor 440. For example, the processor 410 may include an application processor or a sensor hub processor.

According to an embodiment, the processor 410 may control the electronic device 400 to operate in high performance and low power mode. The processor 410 may control the first sensor 440 to be driven in the high performance and/or low power mode, and the first display 420 to be driven in the high performance mode.

According to an embodiment, the electronic device 400 may further include an auxiliary processor (e.g., the supplementary process of FIG. 1) that may be driven together with or independently from a main processor (e.g., the main processor 121 or the application processor of FIG. 1). The auxiliary processor 123 may be driven together with the main processor 121 or may be operated independently. The first sensor 440 may be operatively connected, directly or indirectly, to the main processor 121 and the auxiliary processor 123, and it may be driven through the auxiliary processor 123 while the main processor 121 is in a sleep state. The first sensor 440 may be driven through the auxiliary processor 123 and/or the main processor 121 while the main processor 121 is awake.

For example, the active state of the first display 420 (e.g., the state in which the main processor 121 is operating) may include a state in which all pixels of the display (e.g., the first display 420) are activated. In this case, the first sensor 440 may be controlled by the main processor 121 (e.g., an application processor) and/or the auxiliary processor 123 (e.g., a sensor hub processor).

For example, the inactive state of the first display 420 (e.g., the state in which the main processor 121 is sleeping) may include a state in which at least one pixel of a display (e.g., the first display 420) is inactivated or a state in which all pixels are inactivated. For example, in the case that the first display 420 is in an inactive state, the main processor 121 (e.g., an application processor) is deactivated and the auxiliary processor 123 (e.g., a sensor hub processor) may control the first sensor 440.

Figure 4B:
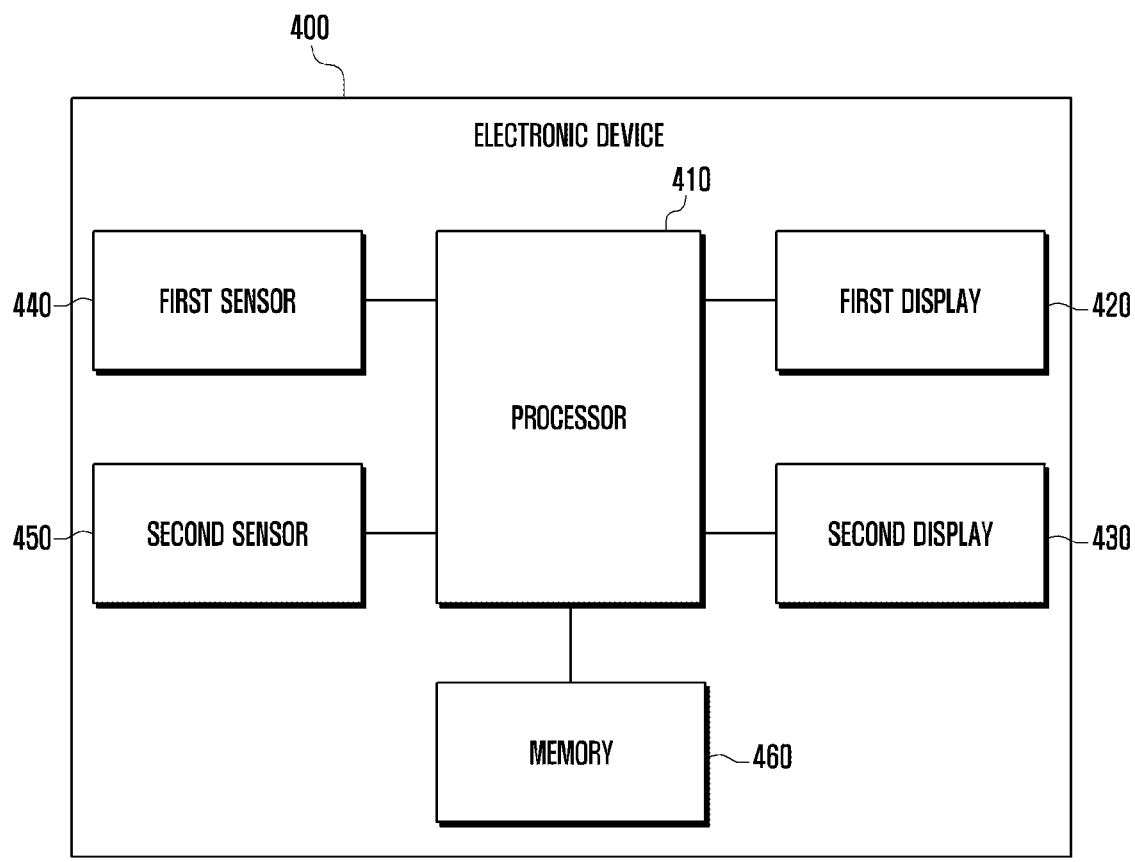

FIG. 4b is a block diagram of an electronic device for controlling screen rotation according to various embodiments. According to an embodiment, the electronic device 400 of FIG. 4b may be at least partially similar to at least one of the electronic device 101 of FIG. 1, the electronic device 200 of FIGS. 2a to 2c, or the electronic device 300 of FIG. 3, or it may further include other embodiments of the electronic device.

According to various embodiments, the electronic device 400 may include a processor 410, a first display 420, a second display 430, a first sensor 440, a second sensor 450, and/or a memory 460. At this time, the number of displays and sensors included in the electronic device 400 is assumed to be two, but this is only an example for description and the number of displays and sensors included in the electronic device 400 is not necessarily limited to two and, depending on the configuration, the electronic device 400 may include more displays and sensors.

According to an embodiment, the processor 410 may be substantially the same as the processor 120 of FIG. 1 and the processor 410 of FIG. 4a or may be included in the processor 120. The first display 420 and/or the second display 430 may be substantially the same as the display module 160 of FIG. 1 or may be included in the display module 160. The first sensor 440 and/or the second sensor 450 may be substantially the same as the sensor module 176 of FIG. 1 or may be included in the sensor module 176. The memory 460 may be substantially the same as the memory 130 of FIG. 1 or may be included in the memory 130.

According to an embodiment, the first display 420 may be substantially the same as the first display 230 of FIG. 2a or may be included in the first display 230. The second display 430 may be substantially the same as the second display 235 of FIG. 2a or may be included in the second display 235. The first sensor 440 may be substantially the same as the first inertial sensor 283a of FIG. 2a or may be included in the first inertial sensor 283a. The second sensor 450 may be substantially the same as the second inertial sensor 283b of FIG. 2a or may be included in the second inertial sensor 283b.

According to various embodiments, the first display 420 may be disposed from at least a portion of the first surface (e.g., the first surface 211 of FIG. 2a) of the first housing (e.g., the first housing 210 of FIG. 2a) of the electronic device 400 to at least a portion of the third surface (e.g., the third surface 221 of FIG. 2a) of the second housing (e.g., the second housing 220 of FIG. 2a). According to an embodiment, the first display 420 may include a flexible display in which at least a partial area may be changed to a flat surface or a curved surface on the basis of a folding angle between the first housing (e.g., the first housing 210 of FIG. 2a) and the second housing (e.g., the second housing 220 of FIG. 2a).

According to various embodiments, the second display 430 may be disposed at least in part in the inner space of the second housing (e.g., the second housing 220 of FIG. 2a) of the electronic device 400 so as to be seen from the outside through the fourth surface (e.g., the fourth surface 222 of FIG. 2a).

According to various embodiments, the first display 420 and/or the second display 430 may display information processed by the electronic device 400. According to an embodiment, the first display 420 and/or the second display 430 may display a content related to an application program executed by the processor 410. According to an embodiment, the first display 420 and/or the second display 430 may display a content related to a low power display mode (e.g., always on display (AOD)) in the case that the electronic device 400 operates in a sleep mode indicating a high performance and/or low power mode. For example, the standby mode of the electronic device 400 may include a state in which at least a partial driving of the processor 410 (e.g., an application processor) is restricted.

According to various embodiments, the first sensor 440 may be disposed in at least a portion of an internal space of the first housing of the electronic device 400 (e.g., the first housing 210 of FIG. 2a). According to an embodiment, the first sensor 440 may collect and provide static information (e.g., the posture of the electronic device 400) of the first housing (e.g., the first housing 210 of FIG. 2a) or information related to movement (e.g., angular velocity and/or acceleration) to the processor 410. For example, the first sensor 440 may include an inertial sensor, a motion sensor, a 6-axis sensor, a first gyro sensor, and/or a first acceleration sensor.

According to various embodiments, the second sensor 450 may be disposed in at least a portion of an internal space of the second housing of the electronic device 400 (e.g., the second housing 220 of FIG. 2a). According to an embodiment, the second sensor 450 may collect and provide static information (e.g., the posture of the electronic device 400) of the second housing (e.g., the second housing 220 of FIG. 2a) or information related to movement (e.g., angular velocity and/or acceleration) to the processor 410. For example, the second sensor 450 may include an inertial sensor, a motion sensor, a 6-axis sensor, a second gyro sensor, and/or a second acceleration sensor.

According to various embodiments, the processor 410 may control the operatively connected first display 420, second display 430, first sensor 440 and/or second sensor 450. For example, the processor 410 may include an application processor or a sensor hub processor.

According to various embodiments, the processor 410 may detect a folding angle of the electronic device 400. According to an embodiment, the processor 410 may detect a folding angle between the first housing (e.g., the first housing 210 of FIG. 2a) and the second housing (e.g., the second housing 220 of FIG. 2a) on the basis of the sensor data collected through the first sensor 440 and the second sensor 450 in the case that the first display 420 and/or the second display 430 are in an active state (e.g., the state where the main processor 121 is operating). For example, in the case that the first display 420 and/or the second display 430 are in an active state, the processor 410 may detect the folding angle between the first housing (e.g., the first housing 210 of FIG. 2a) and the second housing (e.g., the second housing 220 of FIG. 2a) using a first sensor 440, a second sensor 450, and a magnetic detection sensor (e.g., Hall IC). For example, the magnetic sensor may be disposed in the first housing (or the second housing) and detect a magnetic force generated from a magnetic material disposed in the second housing (or the first housing). For example, the active state of the first display 420 and/or the second display 430 may include a state in which all pixels of the display (e.g., the first display 420 and/or the second display 430) are activated. For example, the processor 410 (e.g., an application processor) may be activated in the case that the first display 420 and/or the second display 430 are in an active state. In this case, the first sensor 440 and/or the second sensor 450 may be controlled by the main processor 121 (e.g., an application processor) and/or the auxiliary processor 123 (e.g., a sensor hub processor).

According to an embodiment, the processor 410 may detect a folding angle between the first housing (e.g., the first housing 210) and the second housing (e.g., the second housing 220) on the basis of the sensor data collected through at least a portion of the first sensor 440 (e.g., the first acceleration sensor) and/or at least a portion of the second sensor 450 (e.g., the second acceleration sensor) in the case that the first display 420 and the second display 430 are in an inactive state (e.g., the state where the main processor 121 is dormant). For example, the inactive state of the first display 420 and/or the second display 430 may include a state in which at least one pixel of the display (e.g., the first display 420 and/or the second display 430) is inactive or all pixels are inactive. For example, in the case that the first display 420 and/or the second display 430 are in an inactive state, the main processor 121 (e.g., the application processor) of the processor 410 is deactivated and the auxiliary processor 123 (e.g., the sensor hub processor) may control the first sensor 440 and/or the second sensor 450.

Form of the electronic device 400 to control screen rotation may not be limited to the form of FIGS. 4a to 4b, and it may be implemented in rollable or multi-folding form.

Figure 5A:
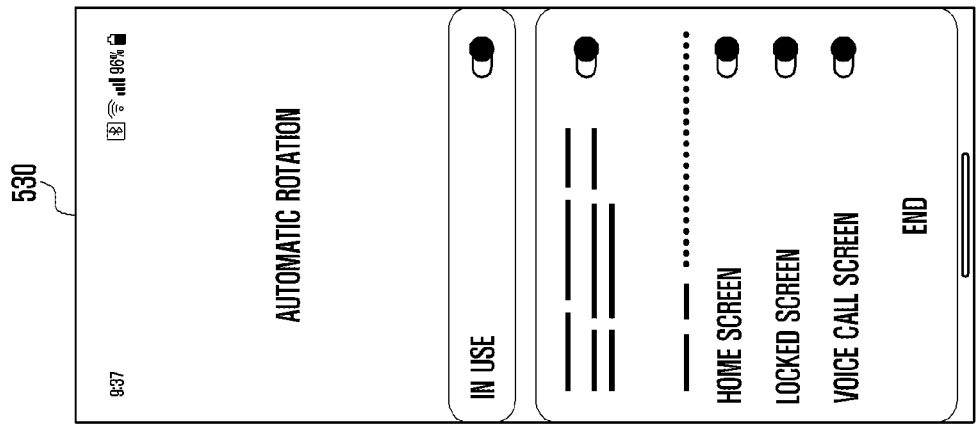
FIGS. 5a to 5c illustrate a screen display and rotation situation of an electronic device according to various example embodiments.
Figure 5A:
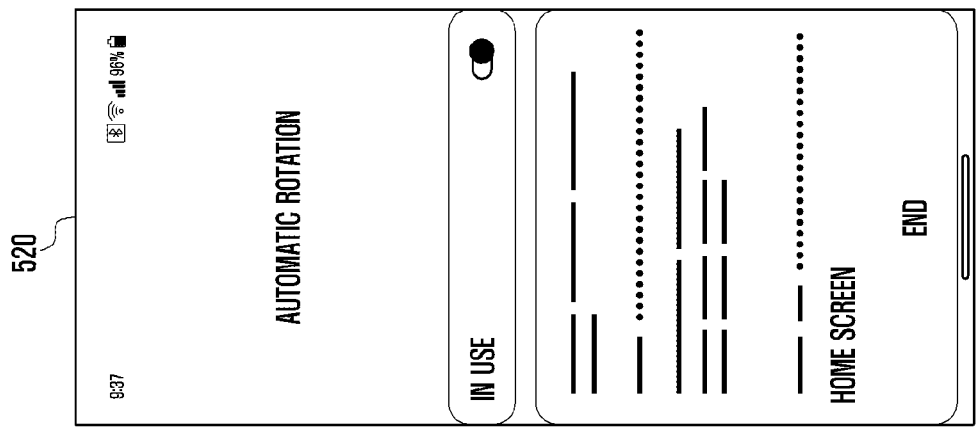
Figure 5A:
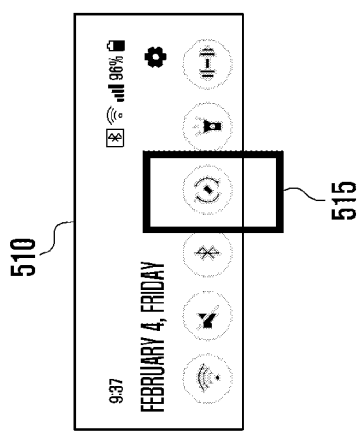
Figure 5B:
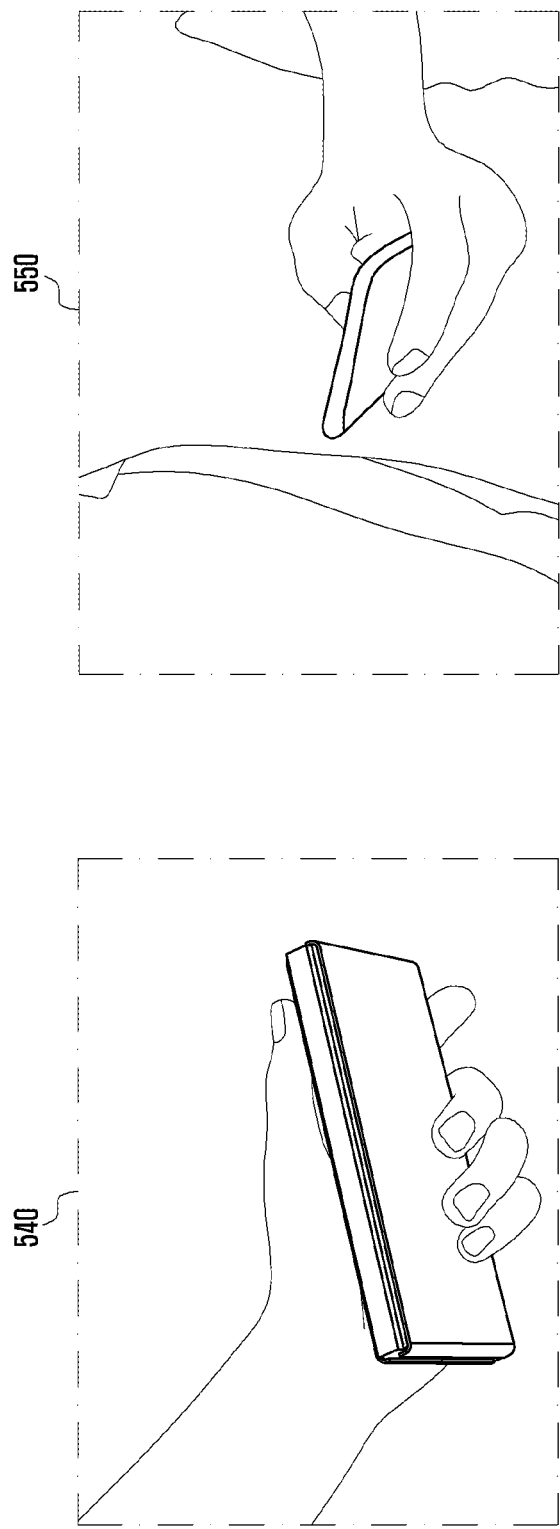
Figure 5C:
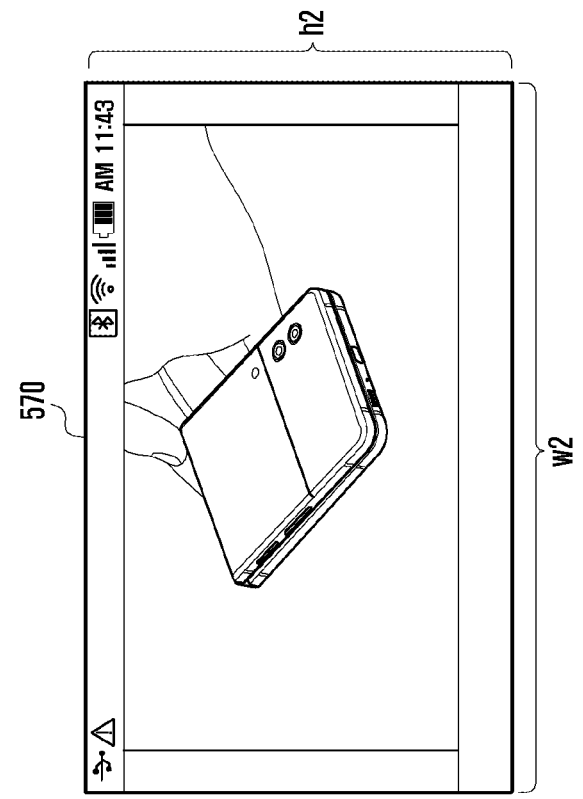
Figure 5C:
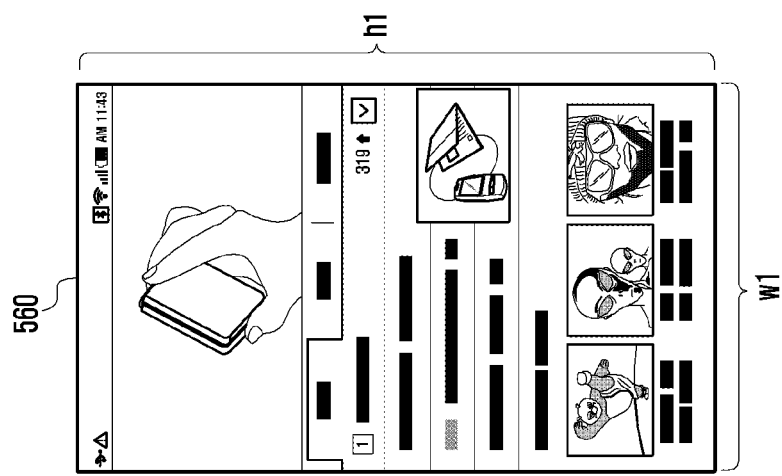

FIGS. 5a to 5c are diagrams illustrating a screen display and rotation situation of an electronic device according to various embodiments.

According to FIG. 5a, the electronic device (e.g. the electronic device 400 of FIG. 4a) may provide a user interface (UI) 510 capable of controlling the electronic device 400 displayed on the first display (e.g., the first display 420 of FIG. 4a). A user interface (UI) 510 may include an icon 515 controlling execution of an automatic screen rotation function. The electronic device 400 may turn on or off the screen auto-rotation function on the basis of the user input (e.g., the touch input) on the icon 515.

According to lines 520 and 530 of FIG. 5a, the electronic device 400 may display the setting screen related to the automatic screen rotation function on the first display 520 on the basis of the user input (e.g., press input) on the icon 515. The electronic device 400 may display at least one of whether the automatic rotation function is being used on the setting screen, whether the rotation button is displayed, and whether a situation for rotating in landscape mode is set.

FIG. 5b illustrates a state in which the user of the electronic device 400 holds the electronic device 400 while walking or standing.

According to FIG. 540, in the case that the user is walking, the electronic device 400 may be in a substantially horizontally lying state with respect to the ground. A state lying horizontally with respect to the ground may indicate the state that a surface of the electronic device 400 closest to the ground is the side surface (e.g., the portion in which the hinge cover 265 of FIG. 2b is located) and not the top (e.g., the cover portion including the sound output device 227 of FIG. 2b) and/or not the bottom (e.g., the cover portion including the sound output device 228 of FIG. 2b). The side surface of the electronic device 400 (e.g., the portion in which the hinge cover 265 of FIG. 2b is located) may generally be formed to be relatively longer than the cover portion including an upper end (e.g., the cover portion including the sound output device 227 of FIG. 2b) and a lower portion (e.g., the cover portion including the sound output device 228 of FIG. 2b). In the case that the electronic device 400 includes the form of a foldable device, FIG. 540 may be interpreted as a state in which the electronic device 400 is laid horizontally on the basis of the electronic device 400 being in a folded state.

The electronic device 400 may determine a gripping state of the electronic device 400 using the first sensor 440. In the situation of FIG. 540, the electronic device 400 may determine that it is in a state lying horizontally with respect to the ground, activate the automatic rotation function, and control the first display 420 so that the first display 420 operates in a landscape mode. The landscape mode may indicate a mode in which the horizontal length of the screen displayed on the first display 420 is greater than the vertical length. The portrait mode may indicate a mode in which the vertical length of the screen displayed on the first display 420 is greater than the horizontal length. The landscape mode and portrait mode will be described in FIG. 5c.

According to FIG. 550, in the electronic device 400 the front surface (e.g., the surface on which the screen is displayed) of the first display 420 may face the user in the situation where the user looks at the electronic device 400 to use it. However, the electronic device 400 may still be in the state of displaying the screen and, in the case that it is convenient to display the screen vertically to the user, displaying the screen horizontally may reduce the usability.

FIG. 5C illustrates a landscape mode 570 and a portrait mode 560 displayed on the first display 420 of the electronic device 400.

The portrait mode 560 may indicate that the vertical length (Ill) of the screen displayed on the first display 420 is greater than the horizontal length (w1). In the case of operating in a portrait mode, the electronic device 400 may control the first display 420 to display the portrait mode 560. The landscape mode 570 may indicate a screen in which the horizontal length (w2) of the screen displayed on the first display 420 is greater than the vertical length (h2). In the case of operating in a landscape mode, the electronic device 400 may control the first display 420 to display the landscape mode 570.

The electronic device 400 may determine the user's gripping state using the first sensor 440 and automatically rotate the screen displayed on the first display 420 on the basis of the user's gripping state. The electronic device 400 may detect the direction in which the screen of the electronic device 400 is rotated using the first sensor (e.g., the first sensor 440 of FIG. 4a) and switch the display screen to landscape mode or portrait mode corresponding to the rotated direction. However, the electronic device 400 may uniformly rotate the screen using the sensor (e.g., the sensor 440 of FIG. 4a) on the basis of, e.g., only, the quantitative amount of physical change, which may not match the actual use environment of the electronic device 400. For example, the electronic device 400 may provide a rotation delay to the user as the vertical rotation response is slow in the case of running an application that has an attribute that a plurality of the users run an application (e.g., the note application including the text) vertically. The rotation delay may indicate a situation where the landscape mode is still provided as the rotation judgment is slow even though the landscape mode should be rotated to the portrait mode in a situation where the user is using the electronic device 400 vertically. On the other hand, the rotation delay may indicate a situation where the portrait mode is still provided as the rotation judgment is slow even though the portrait mode should be rotated to the landscape mode in a situation where the user is using the electronic device 400. The screen delay situation will be described in FIG. 7.

Hereinafter, a method of preventing or reducing rotation delay of the electronic device by controlling the rotation of the electronic device on the basis of the usability attribute of the displayed context will be described in FIGS. 6a to 9.

Figure 6A:
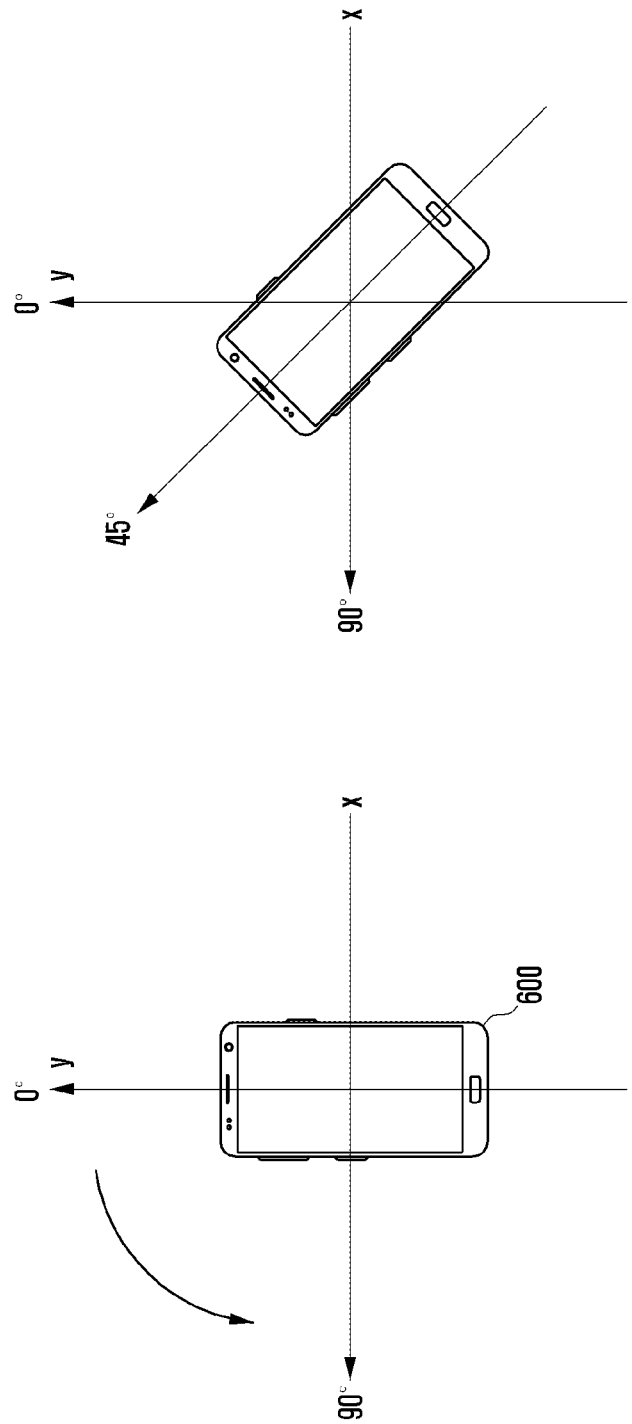
FIGS. 6a to 6c illustrate a screen rotation criterion line of an electronic device and changes in the criterion line according to various example embodiments.
Figure 6B:
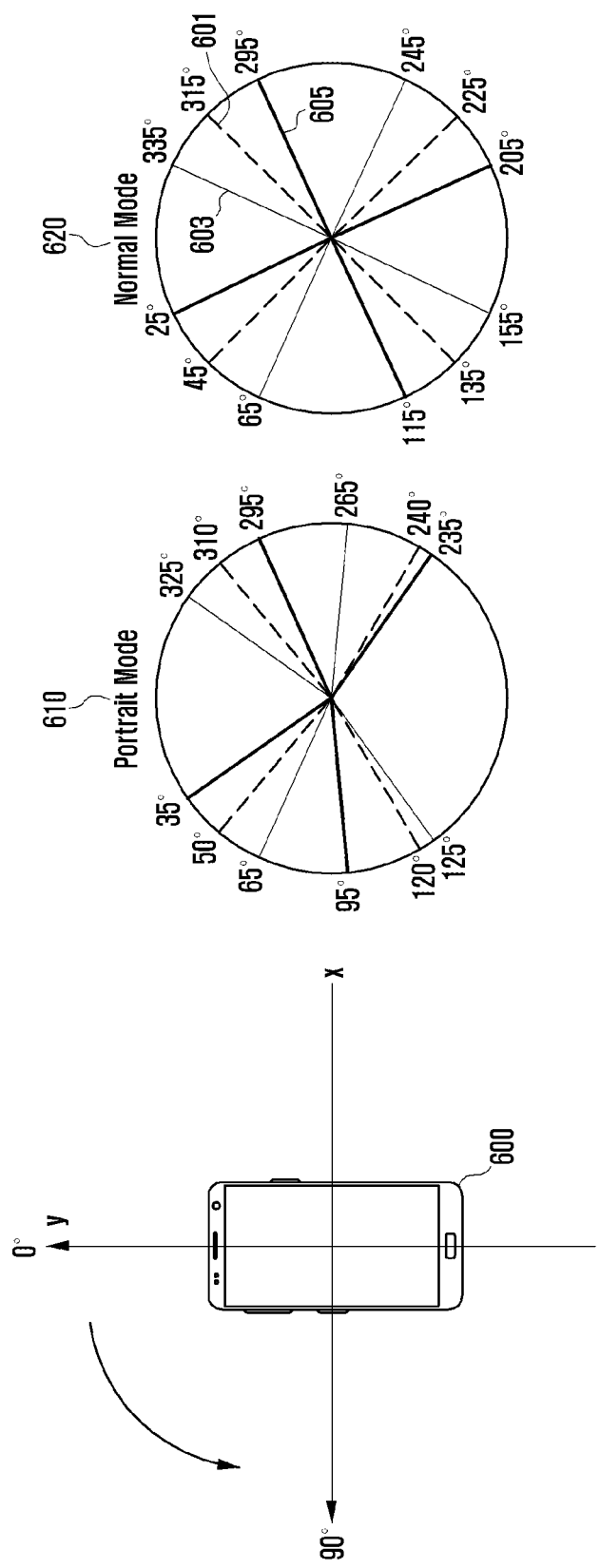
Figure 6C:
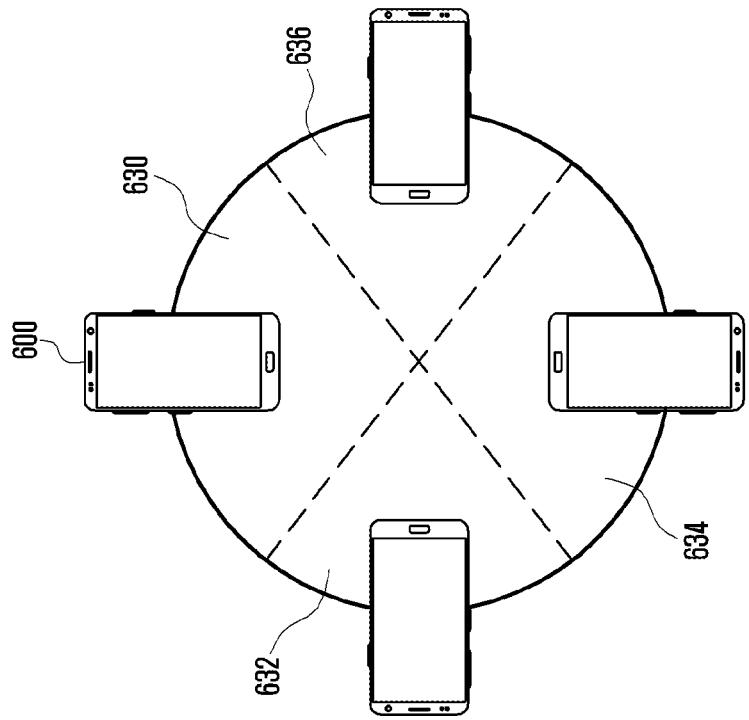
Figure 6C:
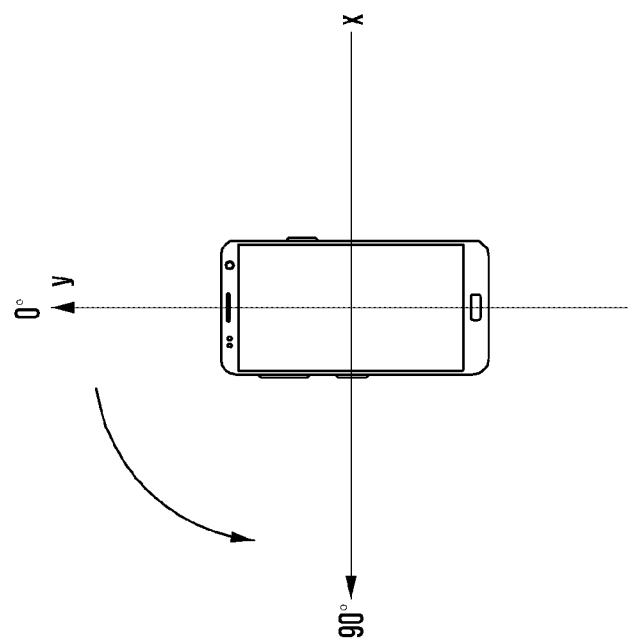

FIGS. 6a to 6c are diagrams illustrating a screen rotation reference line of an electronic device and changes in the reference line according to various embodiments.

According to an embodiment, the electronic device (e.g. the electronic device 400 of FIG. 4a) may identify an attribute related to the main usability of a running application or web site. Main usability may indicate usability of a displayed context.

Here, the context may indicate configuring information about the execution state of a task in the case that a task is performed within the operating system. The usability of the context may indicate a method in which the context is used on the electronic device. For example, the electronic device may display a message on the screen and, in this case, the context may be or include the text.

According to an embodiment, the electronic device 400 may identify an attribute related to the main usability of at least one application or web executed in the foreground. At least one application or web running in the foreground may include a UI (user interface) component including at least one of a screen, a window, or a gadget for graphic configuration. The electronic device 400 may analyze the UI component and determine whether the contents displayed on the display correspond to at least one of a text, an image, or a video on the basis of the analysis result. In the case that the contents displayed on the display include a plurality of components of a text, an image, or a video, the electronic device 400 may determine the feature of the contents displayed on the display on the basis of the most common component among the plurality of components (e.g., main usability attribute).

For example, the electronic device 400 may analyze the UI component, identify that the contents displayed on the display include both text and image on the basis of the analysis result, and determine the main usability attribute of the contents displayed on the display (e.g., the first display 420) on the basis of a component with a relatively larger ratio by comparing the ratio of text on the entire contents and the ratio of image on the entire contents. The context may indicate constituting information about the execution state of a task in the case that a task is performed within the operating system. Contents may be or include contents of an application or web displayed on the display 420. Contents may be intuitively recognized by the user through the display 420, unlike a context that is difficult for the user to intuitively recognize.

According to an embodiment, the electronic device 400 may determine whether the contents displayed on the display on the basis of the constitution of the UI component include relatively more text compared with image or video, or relatively more image or video compared with text.

For example, the electronic device 400 may analyze the UI component, identify that the contents displayed on the display include both text and image on the basis of the analysis result, and determine the main usability attribute of the contents displayed on the display (e.g., the first display 420) on the basis of a component with a relatively larger ratio by comparing the ratio of text on the entire contents and the ratio of image on the entire contents.

The electronic device 400 may determine the main usability attribute of the contents displayed on the display on the basis of the determination. For example, the electronic device 400 may determine that the contents displayed on the display are configured to output text on the basis of the configuration of the UI component and, on the basis of this determination, determine the main usability attribute of the contents displayed on the display as vertical usability. According to an embodiment, the electronic device 400 may determine whether the contents displayed on the display on the basis of the constitution of the UI component include relatively more text compared with image or video, or relatively more image or video compared with text. In the case that the contents displayed on the display include relatively more text on the basis of the constitution of the UI component, the electronic device 400 may output the screen in a portrait mode. In this case, the electronic device 400 may define the usability of a context in which text is relatively more than other videos or images as a portrait mode usability.

For another example, in the case that the contents displayed on the display on the basis of the constitution of the UI component are configured to output relatively more images, the electronic device 400 may display the output information horizontally. The electronic device 400 may display the context horizontally relatively more than vertically because the screen size is displayed relatively larger in the landscape mode than in the portrait mode with respect to the context including the video. In this case, the electronic device 400 may define the usability of a context in which a video or an image is included relatively more than text as a landscape mode usability.

According to an embodiment, the electronic device 400 may determine the display direction of the contents displayed on the display on the basis of the usability of the context. In addition, the electronic device 400 may determine whether to change the display direction of the contents displayed on the display on the basis of the usability of the context. Changing the display direction of the contents may indicate changing the display mode (e.g., a landscape mode or a portrait mode) of the content.

According to an embodiment, the electronic device 400 may determine a rotation criterion for determining whether to change the display direction of the contents on the basis of the usability of the context. The rotation criterion may indicate the criterion for the electronic device 400 to determine whether to change the display direction of the contents. For example, the electronic device 400 may determine to change the display direction of the contents on the basis of identifying that the rotation angle and/or the tilt angle of the electronic device 400 is equal to or greater than (or greater than) a specified size.

The electronic device 400 may determine whether to change the display direction of the contents by using another rotation criterion in accordance with the usability of the context (e.g., usability in portrait mode, usability in landscape mode). For example, while displaying the contents having the portrait mode usability, the electronic device 400 may change the display direction of the contents on the basis of whether the rotation angle and/or the tilt angle of the electronic device 400 is equal to or greater than (or greater than) the first value. While displaying the contents having the landscape mode usability, the electronic device 400 may change the display direction of the contents on the basis of whether the rotation angle and/or the tilt angle of the electronic device 400 is equal to or greater than (or greater than) the second value. The electronic device 400 may be configured by setting the first value greater than the second value so that changing the display direction of the contents to the landscape mode may be relatively more difficult than changing the display direction of the contents to the portrait mode while displaying the contents having portrait mode usability. The electronic device 400 may be configured by setting the first value greater than the second value so that changing the display direction of the contents to the portrait mode may be relatively more easy than changing the display direction of the contents to the landscape mode while displaying the contents having landscape mode usability. Hereinafter, a specific embodiment of determining whether to change the display direction of the contents using another rotation criterion on the basis of the usability of the context will be described.

According to FIG. 6a, the electronic device 600 may include the configuration and/or function of the electronic device 400 of FIG. 4. The electronic device 600 may determine the tilt direction and rotation angle of the electronic device 600 using the sensor (e.g., the first sensor 440 of FIG. 4). The electronic device 600 may measure a rotation angle in a counterclockwise direction with respect to the y-axis. According to FIG. 6a, the electronic device 600 may determine the rotation angle as about 45 degrees in the case that the display (e.g., the first display 420 of FIG. 4) rotates about 45 degrees to the left with respect to the y-axis in a state shown to the user. The electronic device 600 may determine the rotation angle as about 315 degrees (=360 degrees-45 degrees) in the case that the display (e.g., the first display 420 of FIG. 4) rotates about 45 degrees to the right with respect to the y-axis in a state shown the user.

According to FIG. 6b, the processor (e.g., the processor 410 of FIG. 4) may control so that the automatic rotation (e.g., rotation from horizontal direction to vertical direction) of the displayed content may be relatively less by setting the first value relatively high compared with the case where the contents are displayed vertically in the case that the contents displayed on the display 420 are horizontally displayed in response to the determination that the contents displayed on the display 420 have horizontal usability by being mainly displayed in the horizontal direction.

In the case that the contents displayed on the display 420 are vertically displayed, the processor 410 may control so that the automatic rotation (e.g., rotation from horizontal direction to vertical direction) of the displayed content may be relatively easy by setting the first value relatively low compared with the case where the contents are displayed horizontally. Here the first value may be or include the rotation angle of the electronic device 600 set in advance and may be set differently on the basis of the main usability attribute of the context.

In FIG. 6B, 610 and 620 illustrate a boundary line for determining whether to automatically rotate the electronic device 600. 610 and 620 may each include different levels of boundaries and, according to the setting of the boundary line, the processor 410 may perform horizontal rotation of the contents displayed on the display 420 more easily than vertical rotation and may perform vertical rotation more easily than horizontal rotation. It may be identified that the upper boundary line 605 of 620 is about 35 degrees with respect to the second quadrant and the upper boundary line 605 of 620 is about 25 degrees with respect to the second quadrant. In the case of 620, the angle of the upper boundary line 605 is larger than the angle of the upper boundary line 605 of 620; therefore, the screen may be switched, e.g., only, by rotating about 35 degrees, which is greater than about 25 degrees, in the case of switching horizontally. Accordingly, in the case that the angle of the upper boundary line 605 is set to be relatively large as shown in 610, the processor 410 may more easily perform vertical rotation rather than horizontal rotation of the content.

According to 610, the first level for determining whether to automatically rotate the electronic device 600 may include an initial boundary line 601, an upper boundary line 605, and a lower boundary line 603.

The electronic device 600 may determine whether the electronic device 600 is placed vertically or horizontally with respect to the user by using the initial boundary line 601.

For example, in the case that the tilt angle of the electronic device 600 is located between the y-axis and the initial boundary line 601 with respect to the fourth quadrant of FIG. 6b, it may be determined that the electronic device 600 is placed in a vertical direction with respect to the user. Alternatively, in the case that the electronic device 600 has a tilt angle of the electronic device 600 between the x-axis and the initial boundary line 601 with respect to the fourth quadrant of FIG. 6b, it may be determined that the electronic device 600 is placed in a horizontal direction with respect to the user. The initial boundary line 601 on FIG. 6b is only an example and is not limited thereto.

In the case that it is determined that the electronic device 600 is to be placed in the vertical direction with respect to the user, the electronic device 600 may determine whether to rotate horizontally the displayed content using the upper boundary line 605. For example, in FIG. 610, the electronic device 600 may determine not to rotate the displayed content to the horizontal direction as the rotation angle of the electronic device 600 is at a certain level (e.g., about 30 degrees) and so does not exceed the upper boundary line 605 indicating about 35 degrees in a situation in which the electronic device 600 rotates counterclockwise on the x-axis with respect to the y-axis in the fourth quadrant of FIG. 6b.

In FIG. 620, the electronic device 600 may determine to rotate the displayed content to the horizontal direction as the rotation angle of the electronic device 600 is at a certain level (e.g., about 30 degrees) and so exceeds the upper boundary line 605 indicating about 25 degrees in a situation in which the electronic device 600 rotates counterclockwise on the x-axis with respect to the y-axis in the fourth quadrant of FIG. 6b. The upper boundary line 605 of FIG. 6b is only an example and is not limited thereto.

Alternatively, in the case that it is determined that the electronic device 600 is placed in the vertical direction with respect to the user, the electronic device 600 may determine whether to rotate horizontally the displayed content using the lower boundary line 603. For example, in FIG. 610, the electronic device 600 may determine not to rotate the displayed content to the horizontal direction as the rotation angle of the electronic device 600 is at a certain level (e.g., about −30 degrees or about 330 degrees) and so does not exceed the lower boundary line 603 indicating about −35 degrees (or about 325 degrees) in a situation in which the electronic device 600 rotates clockwise on the x-axis with respect to the y-axis in the first quadrant of FIG. 6b. In FIG. 620, the electronic device 600 may determine to rotate the displayed content to the horizontal direction as the rotation angle of the electronic device 600 is at a certain level (e.g., about −30 degrees or 330 degrees) and so exceeds the lower boundary line 603 indicating about −25 degrees (or about 335 degrees) in a situation in which the electronic device 600 rotates clockwise on the x-axis with respect to the y-axis in the first quadrant of FIG. 6b. The lower boundary line 603 of FIG. 6b is only an example and is not limited thereto.

According to an embodiment, the electronic device 600 may have an initial boundary line 601, an upper boundary line 605, and a lower boundary line 603 that are symmetrical as shown in FIG. 620; but, as shown in FIG. 610, it may have an initial boundary line 601, an upper boundary line 605, and a lower boundary line 603 that are asymmetrical. The electronic device 600 may set the rotation sensitivity differently in the horizontal and vertical directions by setting asymmetrically at least one of the initial boundary line 601, the upper boundary line 605, or the lower boundary line 603. Here, the asymmetry may be determined on the basis of the x-axis and the y-axis and, for example, in FIG. 620, the electronic device 600 may have a symmetrical upper boundary line 605 in the case that the upper boundary line 605 has about 115 degrees and about 295 degrees. In this case, the electronic device 600 may have a symmetrical upper boundary line 605 and may set the rotation sensitivity in the case of clockwise rotation and the rotation sensitivity in the case of counterclockwise rotation to be the same.

In FIG. 610, in the case that the upper boundary line 605 has about 95 degrees and about 295 degrees, the electronic device 600 may have an asymmetrical upper boundary line 605. In this case, the electronic device 600 may have an asymmetrical upper boundary line 605 and may set the rotation sensitivity in the case of clockwise rotation and the rotation sensitivity in the case of counterclockwise rotation to be different. In the case that the upper boundary line 605 has about 95 degrees and about 295 degrees, the electronic device 400 may control so that the rotation from the horizontal direction to the vertical direction may occur relatively easily, but the rotation from the vertical direction to the horizontal direction may not occur relatively easily. The angle of FIG. 6b is only an example and is not limited thereto, and the electronic device 400 may set, by adjusting differently at least one setting of the initial boundary line 601, the upper boundary line 605, or the lower boundary line 603, so that rotation from the horizontal direction to the vertical direction may be relatively easy and rotation from the vertical direction to the horizontal direction may be relatively difficult, and conversely, rotation from the vertical direction to the horizontal direction may be relatively easy and rotation from the horizontal direction to the vertical direction may be relatively difficult.

According to FIG. 6c, the electronic device 600 may include a first state 630 and a third state 634 arranged in a vertical direction with respect to the user. The first state 630 may be or include a state in which the electronic device 600 is positioned between the initial boundary line 601 and the y-axis with respect to the fourth quadrant. Alternatively, the first state 630 may be or include a state in which the electronic device 600 is positioned between the initial boundary line 601 and the y-axis with respect to the first quadrant. The third state 634 may be or include a state in which the electronic device 600 is positioned between the initial boundary line 601 and the y-axis with respect to the third quadrant. Alternatively, the third state 634 may be or include a state in which the electronic device 600 is positioned between the initial boundary line 601 and the y-axis with respect to the second quadrant.

The electronic device 600 may include a second state 632 and a fourth state 636 arranged in a horizontal direction with respect to the user. The second state 632 may be or include a state in which the electronic device 600 is positioned between the initial boundary line 601 and the x-axis with respect to the fourth quadrant. Alternatively, the second state 632 may be or include a state in which the electronic device 600 is positioned between the initial boundary line 601 and the x-axis with respect to the third quadrant. The fourth state 636 may be or include a state in which the electronic device 600 is positioned between the initial boundary line 601 and the x-axis with respect to the first quadrant. Alternatively, the fourth state 636 may be or include a state in which the electronic device 600 is positioned between the initial boundary line 601 and the x-axis with respect to the second quadrant.

Figure 7:
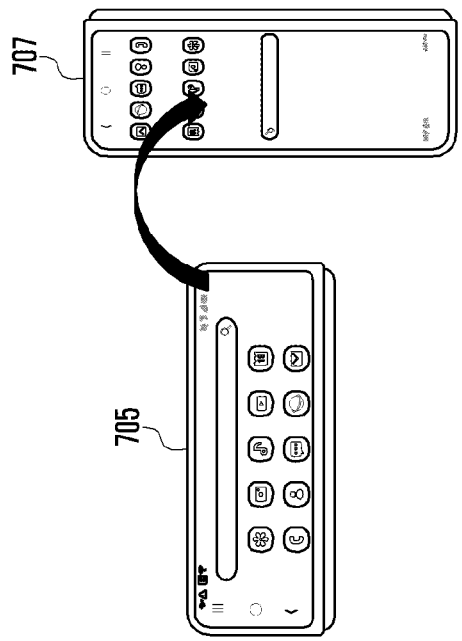
FIG. 7 illustrates a screen rotation situation of an electronic device according to various example embodiments.
Figure 7:
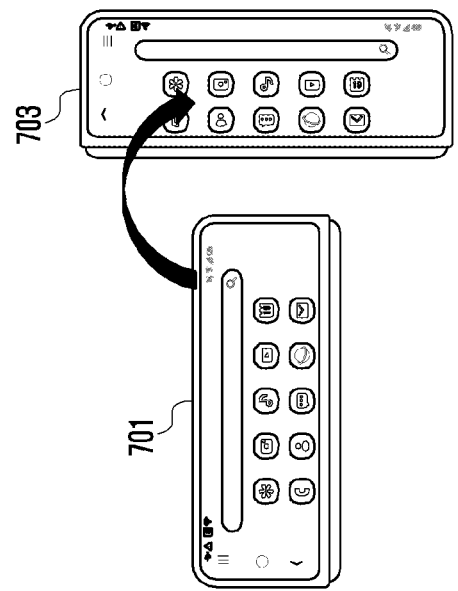

FIG. 7 illustrates a screen rotation situation of an electronic device according to various embodiments.

According to an embodiment, the electronic device (e.g. the electronic device 400 of FIG. 4) may not support the reverse portrait rotation even with the automatic rotation setting turned on in order to distinguish the receiver position. However, the electronic device 400 may require the rotation to the vertical direction (e.g. the reverse portrait) when it detects the device orientation in the reverse portrait direction in the case that the enhancement of vertical usability is necessary. The vertical rotation may indicate rotation in the vertical direction in the case of being detected as a reverse portrait.

For example, 701 may indicate a situation in which the electronic device 400 is gripped horizontally by the user. In this case, the electronic device 400 may display the contents horizontally. In the case that the rotation in reverse portrait is not supported on the electronic device 400, the electronic device 400 may still display the contents horizontally in a situation where the electronic device 400 is gripped vertically by the user as shown in FIG. 703. In this case, the user's viewing direction is vertical, but the screen of the electronic device 400 is displayed horizontally and they do not coincide with each other, thereby providing inconvenient usability to the user.

The electronic device 400 according to various embodiments may analyze a UI component, determine whether the contents displayed on the display (e.g., the first display of 420 of FIG. 4) correspond to at least one of a text, an image, or a video on the basis of the analysis result, and, based on this, determine the main usability attribute indicating in which direction the contents may be mainly displayed, horizontally or vertically. "Based on" as used herein covers based at least on.

The electronic device 400 according to various embodiments may determine the display direction of the contents on the basis of the main usability attribute of the context even in the situation that does not support the reverse portrait rotation to distinguish the receiver position. In this case, the electronic device 400, in the situation of 705 and 707 as with the terminal supporting the reverse portrait rotation, may provide comfortable usability to the user by rotating the direction of the contents displayed in response to the rotation of the electronic device 400.

Figure 8:
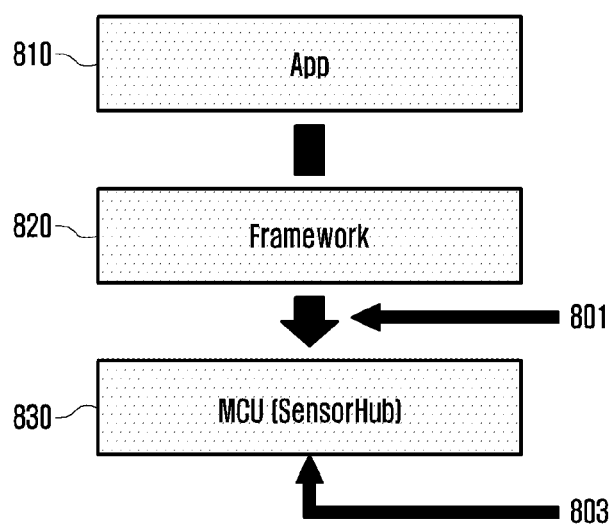
FIG. 8 illustrates a situation that determines the main usability attribute of an application executed on an electronic device according to various example embodiments.

FIG. 8 illustrates a situation in which a main usability attribute of an application executed on an electronic device is determined according to various embodiments.

In FIG. 8, the content necessary for the implementation of this document is described and. depending on the implementation, at least one entity or layer not shown in FIG. 8 (e.g., HAL (hardware abstract layer), Kernel driver, etc.) may be further included.

According to an embodiment, the electronic device (e.g. the electronic device 400 of FIG. 4) may determine the main usability attribute of the context on the basis of a package name of the context and the package name may be determined during development of an application including the context.

The application 810 executed on the electronic device 400 may provide information including at least one of a usability attribute or a package name of the application 810 being executed as a framework 820 layer. According to various embodiments, the framework 820 layer may provide various functions to the application 810 layer so that functions or information provided from one or more resources of the electronic device 400 may be used by the application 810. The framework 820 may identify the usability of the application 810 being executed on the electronic device 400 and transmit information indicating that the usability of the application 810 being executed as MCU (micro controller unit) (or the auxiliary processor (e.g., the sensor hub processor)) 830 is changed, in response to detecting a change in the usability of the application 810. According to various embodiments, the MCU (micro controller unit) 830 may be or include various pieces of hardware included in the electronic device 400. The MCU (micro controller unit) 830 may integrate and manage at least more than one sensor, and process the sensing information with low power consumption. The MCU (micro controller unit) 830 may rotate the display direction of the displayed context in response to identifying that the usability of the running application 810 is changed.

Figure 9:
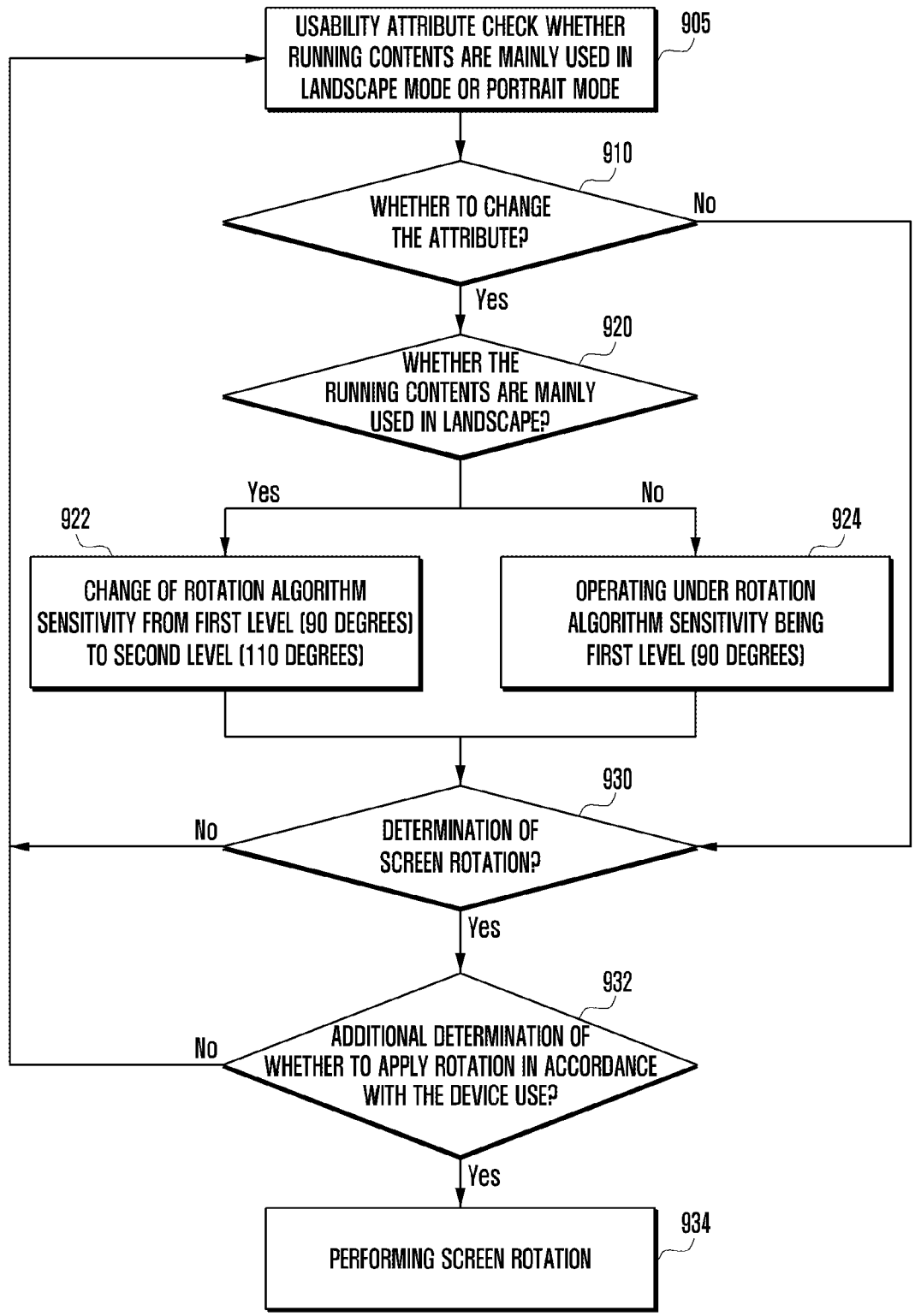
FIG. 9 is a flowchart illustrating a method for controlling screen rotation of an electronic device according to various example embodiments.

FIG. 9 is a flowchart illustrating a method for controlling screen rotation of an electronic device according to various embodiments.

The illustrated method 900 may be implemented by the processor (e.g., the processor 410 of FIG. 4) of the electronic device (e.g., the electronic device 400 of FIG. 4a or 4b) described above through FIGS. 1 to 8 and the technical features described above will be omitted below. The operations described through FIG. 9 may be implemented on the basis of instructions that may be stored in a computer recording medium or a memory (e.g., the memory 460 of FIG. 4).

In operation 905, the electronic device 400 may identify an attribute related to the main usability of a running application or web site. The main usability may indicate the usability of a context on an application or web site. The electronic device 400 may determine the usage direction of the contents displayed on the display on the basis of the usability attribute of the context. For example, the electronic device 400, in the case that the context includes a relatively large amount of text, may determine that the text is mainly used in portrait mode, and may determine that the main usability of a running application or web site is portrait mode usability. Alternatively, the electronic device 400, in the case that the context includes a relatively large amount of video or image, may determine that the video or the image is mainly used in landscape mode, and may determine that the main usability of a running application or web site is landscape mode usability.

Here, the context may indicate configuring information about the execution state of a task in the case that a task is performed within the operating system. The usability of the context may indicate a method in which the context is used on the electronic device. For example, the electronic device may display a message on the screen and, in this case, the context may indicate the text.

According to an embodiment, the electronic device 400 may identify an attribute related to the main usability of at least one application or web executed in the foreground. At least one application or web running in the foreground may include a UI (user interface) component including at least one of a screen, a window, or a gadget for graphic configuration. The electronic device 400 may analyze the UI component and determine whether the contents displayed on the display correspond to at least one of a text, an image, and a video on the basis of the analysis result. In the case that the contents displayed on the display include a plurality of components of a text, an image, or a video, the electronic device 400 may determine the feature of the contents displayed on the basis of including more of the plurality of components. For example, the electronic device 400 may analyze the UI component, identify that the contents displayed on the display include both text and image on the basis of the analysis result, and determine the main usability attribute of the contents displayed on the display on the basis of a component with a relatively larger ratio by comparing the ratio of text on the entire contents and the ratio of image on the entire contents.

According to an embodiment, the electronic device 400 may determine whether the contents displayed on the display are set to output text or image on the basis of the configuration of the UI component. The electronic device 400 may determine the main usability attribute of the contents displayed on the display on the basis of the determination. For example, the electronic device 400 may determine that the contents displayed on the display are set to output text on the basis of the configuration of the UI component and, on the basis of this determination, the main usability attribute of the contents displayed on the display may be determined as vertical usability. According to an embodiment, the electronic device 400 may determine whether the contents displayed on the display are set to output text or image on the basis of the configuration of the UI component. In the case that the contents displayed on the display are set to output a relatively larger amount of text on the basis of the configuration of the UI component, the electronic device 400 may display vertically the information output for identifying and typing the content of the message. In this case, the electronic device 400 may define the usability of a content in which text is relatively more than other videos or images as a vertical direction.

For another example, in the case that the contents displayed on the display on the basis of the configuration of UI component are configured to output relatively more images, the electronic device 400 may display the output information horizontally. The electronic device 400 may display the contents horizontally relatively more than vertically because the screen size is displayed relatively larger in the horizontal direction than in the vertical direction with respect to the contents including a video. In this case, the electronic device 400 may define the usability of content in which a video or an image is included relatively more than text as a horizontal direction.

According to an embodiment, the electronic device 400 may determine the display direction of the contents displayed on the display on the basis of the usability of the context. In addition, the electronic device 400 may determine whether to rotate the display direction of the contents displayed on the display on the basis of the usability of the context.

According to an embodiment, the electronic device 400 may determine a rotation criterion in the case of rotating the display direction of the contents on the basis of the usability of the context.

In operation 910, the electronic device 400 may identify whether the main usability attribute of the contents displayed on the display is changed. The main usability attribute of content may vary depending on the type of context. The type of context may, for example, include at least one of a text, an image, or a video. The main usability attribute of a context is, for example, may include a horizontal usability or a vertical usability.

According to an embodiment, the electronic device 400 may identify the main usability attribute of context (e.g., the application) on the basis of the package name on the context (e.g., the application). For example, the application may include a package name that is a unique name of the application. A package name of the application may be registered on the application during development of the application. The application may further include usability attribute information determined according to a situation in which the application is mainly used in the package name. The usability attribute information may, for example, include a horizontal usability or a vertical usability. The electronic device 400 may determine the main usability attribute of the context (e.g., the application) on the basis of the package name on the context (e.g., the application).

According to an embodiment, the electronic device 400 may determine the main usability attribute of the context (e.g., the application) on the basis of whether a specific component is used in a situation where the application is running. For example, the electronic device 400 may determine, on the basis of the use of at least one codec, that the main usability attribute of the contents (e.g., the application) displayed on the display includes the horizontal usability. The electronic device 400 may encode the data using a codec to facilitate data management and decrypt the data to be read again. The electronic device 400 may digitize voice or video data to facilitate easy processing by using a codec. The electronic device 400 may compress the size of data using a codec. A codec may be used to compress the size of data and there may be more cases in which the codec is used to process more video data than text data. For this reason, the electronic device 400 may determine, in a situation where a codec is used, that the main usability attribute of the contents (e.g., the application) displayed on the display includes the horizontal usability.

Components used on the electronic device 400 are not limited to a codec and it may be determined, using at least one of a camera, a navigation, a GPS, and an inertial sensor, that the main usability attribute of the contents (e.g., the application) displayed on the display includes the horizontal usability.

According to an embodiment, the electronic device 400 may determine the main usability attribute of the contents (e.g., the application) on the basis of the refresh rate. The refresh rate of the display may be a number indicating how many scenes may be displayed on the screen per the time unit (e.g., 1 second). For example, if the refresh rate of the display is 60 Hz, the electronic device 400 may display 60 images for 1 second on the display. For example, if the refresh rate of the display is 120 Hz, the electronic device 400 may display 120 images for 1 second on the display.

The electronic device 400 may identify that the context includes relatively more text compared with an image or a video on the basis of the configuration of the UI component. The electronic device 400 may display the contents on the display using a relatively low refresh rate compared with the case of displaying an image or a video in response to the identification that the context includes relatively more text compared with an image or a video.

The electronic device 400 may have a relatively low refresh rate in displaying the text as relatively less screen change may occur compared with at least one of an image, a video, or a 3D rendering.

Conversely, the electronic device 400 may determine whether the context includes at least one of an image, a video, or a 3D rendering relatively more than text on the basis of the constitution of UI component.

According to an embodiment, the electronic device 400 may determine the main usability of the contents displayed on the display on the basis of at least one of a package name or a configuration of a UI component with respect to at least one application including a game service. For example, the electronic device 400 may identify whether the at least one application including the game service is running on the basis of the configuration of UI component. The electronic device 400 may determine that the contents displayed on the display include relatively more image or video than text in response to the identification that at least one application including a game service is running. The electronic device 400 may determine the main usability attribute of the contents displayed on the display as a landscape mode usability on the basis of determining that the contents displayed on the display include relatively more images or video than text.

According to an embodiment, the electronic device 400 may determine that the contents displayed on the display include relatively more text than an image or a video in response to identifying that at least one application including a game service is not being executed on the basis of the configuration of the UI component. The electronic device 400 may determine the main usability attribute of the contents as a portrait mode usability on the basis of determining that the contents displayed on the display include relatively more text than an image or a video.

The electronic device 400 may display the contents on the display using a relatively high refresh rate compared with displaying the contents including a relatively large amount of text on the display in response to identifying that the context includes at least one of an image, a video, or a 3D rendering exceeding a certain ratio on the basis of the configuration of the UI component. The electronic device 400 may have a relatively high refresh rate as the screen change may occur relatively frequently compared with the text in displaying at least one of an image, a video, and a 3D rendering. The electronic device 400 may change the refresh rate on the basis of the number of screen changes of the current contents displayed on the display and determine the main usability of the current contents displayed on the display on the basis of the changed refresh rate.

For example, the electronic device 400 may determine that the context includes many texts in which screen switching is relatively infrequent in the case that the refresh rate of the display is less than the first level (e.g., about 60 Hz), and it may determine that the main usability of the current context is close to vertical usability. The main usability of a context including text has been described above. Alternatively, the electronic device 400 may determine that the context includes much video in which screen switching is relatively frequent in the case that the refresh rate of the display is greater than the second level (e.g., about 100 Hz), and it may determine that the main usability of the current context is close to horizontal usability. The main usability of a context including a video has been described above.

In operation 910, the electronic device 400 may maintain the existing attribute of the contents on the basis of identifying that the main usability attribute of the contents displayed on the display is not changed and, in operation 930, it may determine whether the screen of the electronic device 400 is rotated.

In operation 920, the electronic device 400 may determine whether the main usability of the contents is horizontal or vertical on the basis of identifying that the main usability attribute of the contents displayed on the display is changed. The way that the electronic device 400 determines the main usability of the context may, for example, include at least one of using the package name of the context, identifying whether to use a specific component (e.g., the codec), or using the refresh rate of the display.

In operation 922, the electronic device 400 may change the sensitivity of the rotation algorithm of the electronic device 400 from the first level (e.g., about 90 degrees) to the second level (e.g., about 110 degrees) in response to identifying that the main usability attribute of the contents displayed on the display is the horizontal attribute. In the drawings, it has been described assuming that the main usability attribute of the contents displayed on the display is the horizontal attribute, but this is only an example and is not limited thereto. In the case that the main usability attribute of the contents displayed on the display is the vertical attribute, the electronic device 400 may change the sensitivity of the rotation algorithm of the electronic device 400 from the second level (e.g., about 110 degrees) to the first level (e.g., about 90 degrees).

The electronic device 400 may recognize that it is rotated at a certain level of rotation and the sensitivity of the rotation algorithm of the electronic device 400 may indicate a criterion indicating the degree of rotation recognized as being the rotation. For example, in the case that the electronic device 400 changes the rotation algorithm sensitivity to the second level, even if it is rotated at the first level (e.g., about 90 degrees), it is not recognized as being rotated and it may be determined to have been rotated, e.g., only, when the rotation is greater than the second level (e.g., about 110 degrees). In the case that the electronic device 400 changes the rotation algorithm sensitivity to the second level, the electronic device 400 may reduce relatively the ratio for determining to rotate the screen compared with the case where the sensitivity of the rotation algorithm is applied at the first level and, in the case that the user does not intend to rotate the screen, more satisfactory usability may be provided.

In the case that the main usability attribute of the contents displayed on the display is the horizontal attribute, the contents may include relatively more video exceeding a certain level at screen change than text. The electronic device 400 may provide a relatively larger screen in the horizontal direction than in the vertical direction in the case of playing a video; therefore, it may be determined that the case where the user rotates the electronic device 400 located in the vertical direction to the horizontal direction is relatively more frequent than the case where the user rotates the electronic device 400 located in the horizontal direction to the vertical direction. On the basis of this determination, in the case that the electronic device 400 is located in a vertical direction, the electronic device 400 may control relatively easily the change to the horizontal direction by setting more sensitively the rotation sensitivity to the first level (e.g., about 90 degrees), which is less than the second level (e.g., about 110 degrees). In the case that the rotation sensitivity is configured at the first level (e.g., about 90 degrees), which is lower than the second level (e.g., about 110 degrees), the electronic device 400 may change the display direction of the contents in response to the rotation of the electronic device exceeding the first level.

Conversely, in the case that the electronic device 400 is located in the horizontal direction, the electronic device 400 may control so that rotation does not occur relatively easily in the horizontal direction by configuring relatively insensitively the rotation sensitivity to the second level (e.g., about 110 degrees), which is higher than the first level (e.g., about 90 degrees). In the case that the rotation sensitivity is at the second level (e.g., about 110 degrees), which is higher than the first level (e.g., about 90 degrees), the electronic device 400 may change the display direction of the contents in response to the rotation of the electronic device exceeding the second level without changing the display direction of the contents even in the case that the electronic device 400 is rotated to the first level.

In operation 924, the electronic device 400 may apply sensitively the rotation algorithm sensitivity of the electronic device 400 in response to identifying that the main usability attribute of the contents displayed on the display is the vertical attribute.

In the case that the main usability attribute of the contents displayed on the display is the vertical attribute, the contents may include relatively more text where the screen change is less than a certain level than video.

According to an embodiment, the electronic device 400 may determine whether the contents displayed on the display are configured to output text or image on the basis of the configuration of the UI component. The electronic device 400 may determine the main usability attribute of the contents displayed on the display on the basis of the determination. For example, the electronic device 400 may determine that the contents displayed on the display are configured to output text on the basis of the configuration of the UI component and, on the basis of this determination, the main usability attribute of the contents displayed on the display may be determined as vertical usability. The electronic device 400 may determine whether the contents displayed on the display are configured to output text on the basis of the configuration of the UI component. For example, the electronic device 400 may determine that the contents displayed on the display are configured to output text in response to identifying that UI component includes a list type component including at least one of a component for displaying text, a component for editing, and/or a configuring menu or an app store.

The electronic device 400 may control to display vertically the contents on the display in response to determining that the contents are configured to output the text on the basis of the configuration of the UI component. In the case of displaying the contents set to output relatively more text, the electronic device 400 may provide the usability in which it is relatively easy to read in portrait mode rather than in landscape mode and even typing is easy. Therefore, in the case of displaying the context including text, the electronic device 400 may determine that there are relatively more cases in which the user rotates the electronic device 400 located in the horizontal direction to the vertical direction than the case in which the user rotates the electronic device 400 located in the vertical direction to the horizontal direction. In the case that the electronic device 400 is located in the horizontal direction on the basis of this determination, the electronic device 400 may relatively easily control the change to the vertical direction by sensitively configuring the rotation sensitivity at the first level (e.g., about 90 degrees) that is lower than the second level (e.g., about 110 degrees). Conversely, in the case that the electronic device 400 is located in the vertical direction, the electronic device 400 may control so that rotation does not occur relatively easily from the vertical direction to the horizontal direction by configuring relatively insensitively the rotation sensitivity at the second level (e.g., about 110 degrees), which is higher than the first level (e.g., about 90 degrees). In the drawings, it has been described assuming that the main usability attribute of the contents displayed on the display is the horizontal attribute, but this is only an example and is not limited thereto. In the case that the main usability attribute of the contents displayed on the display is the vertical attribute, the electronic device 400 may change the sensitivity of the rotation algorithm of the electronic device 400 from the second level (e.g., about 110 degrees) to the first level (e.g., about 90 degrees).

In operation 930, the electronic device 400 may determine whether the electronic device 400 is rotated on the basis of the previously determined rotation algorithm sensitivity. Again, in operation 905, the electronic device 400 may check the main usability attribute of the running context or end the screen rotation control operation in response to identifying that the electronic device 400 is not rotated.

In operation 932, the electronic device may reapply the rotation algorithm sensitivity on the basis of the usability (e.g., the horizontal usability or the vertical usability) of the contents in response to identifying that the electronic device 400 is rotated, and it may determine whether to apply the rotation of the electronic device 400. The electronic device 400 may determine whether rotation is applied in accordance with the usability of the contents and perform the screen rotation in operation 934 in response to determining that application of rotation is necessary. Alternatively, the electronic device 400 may determine whether rotation is applied in accordance with the usability of the contents and return again to operation 905 and identify the usability attribute of the contents being executed in response to determining that rotation application is not necessary.

Figure 10:
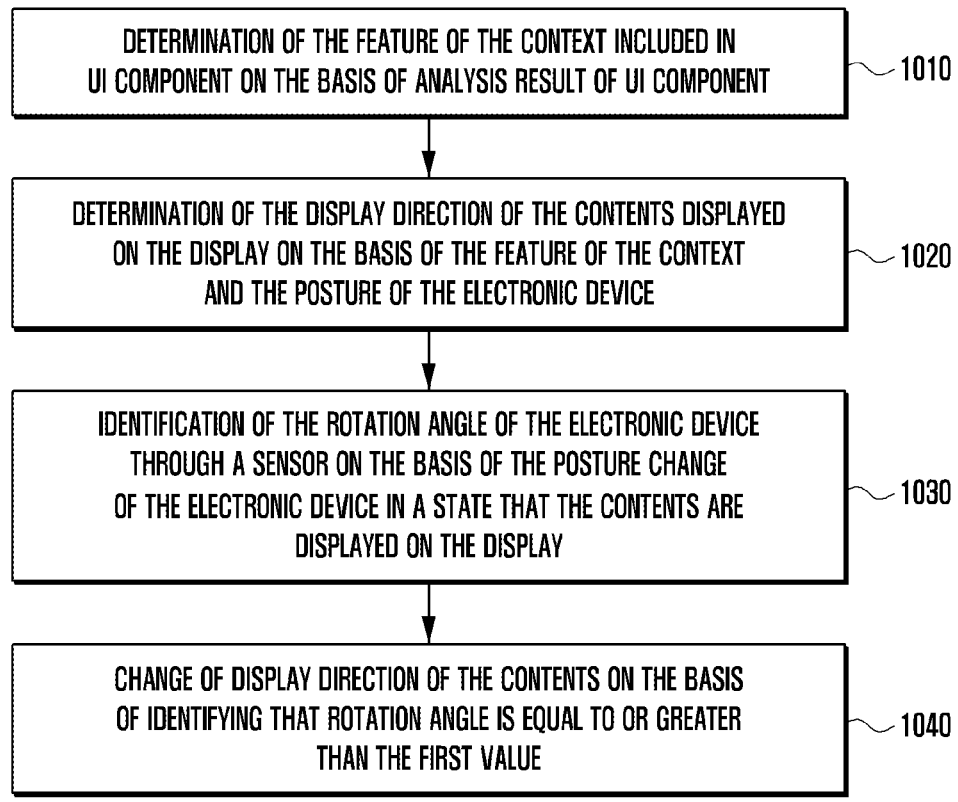
FIG. 10 is a flowchart illustrating a method of displaying a screen of an electronic device according to various example embodiments.

FIG. 10 is a flowchart illustrating a method of displaying a screen of an electronic device according to various embodiments.

The screen display method of the electronic device (e.g., the electronic device 400 of FIG. 4) according to various embodiments may include an operation of determining the feature of the context included in UI component on the basis of an analysis result of the UI component, an operation of determining the display direction of the contents displayed on the display (e.g., the first display 420 of FIG. 4) on the basis of the feature of the context and the posture of the electronic device 400, an operation of identifying the rotation angle of the electronic device 400 through the sensor (e.g., the first sensor 440 of FIG. 1) in accordance with the posture change of the electronic device 400 in a state in which the contents are displayed on the display 420, and an operation of changing the display direction of the contents on the basis of identifying that the rotation angle is greater than the first value.

In operation 1010, the electronic device 400 may determine the feature of the context included in UI component on the basis of an analysis result of the UI component.

According to an embodiment, the operation of determining the feature of the context included in the UI component on the basis of an analysis result of the UI component may further include the operation of determining the main usability attribute of the context on the basis of the refresh rate of the display 420.

In operation 1020, the electronic device 400 may determine the display direction of contents displayed on the display on the basis of the feature of the context and the posture of the electronic device.

In operation 1030, the electronic device 400 may identify the rotation angle of the electronic device 400 through a sensor 440 in accordance with the posture change of the electronic device in a state in which the context is displayed on the display 420.

In operation 1040, the electronic device 400 may control to change the display direction of the contents on the basis of identifying that the rotation angle is equal to or greater than the first value. The first value may indicate a rotation angle of the electronic device 400 set in advance and may be configured differently on the basis of the main usability attribute of the context.

According to an embodiment, an operation of changing the display direction of the contents on the basis of identifying that the rotation angle is equal to or greater than the first value may further include an operation of controlling the automatic rotation of the displayed content to occur at relatively low frequency by configuring the first value relatively high in the case that the contents displayed on the display 420 are horizontally displayed compared with the case where the contents displayed on the display 420 are vertically displayed in response to determining that the contents displayed on the display 420 have the horizontal usability by being mainly displayed in the horizontal direction, and the operation of controlling the automatic rotation of the displayed content to occur at relatively high frequency by setting the first value relatively low in the case that the contents displayed on the display 420 are vertically displayed compared with the case where the contents displayed on the display 420 are horizontally displayed.

According to an embodiment, an operation of changing the display direction of the contents on the basis of identifying that the rotation angle is equal to or greater than the first value may further include an operation of controlling the automatic rotation of the displayed content to occur at relatively low frequency by configuring the first value relatively high in the case that the contents displayed on the display 420 are vertically displayed compared with the case where the contents displayed on the display 420 are horizontally displayed in response to determining that the contents displayed on the display 420 have the vertical usability by being mainly displayed in the vertical direction, and the operation of controlling the automatic rotation of the displayed content to occur at relatively high frequency by configuring the first value relatively low in the case that the contents displayed on the display 420 are horizontally displayed compared with the case where the contents displayed on the display 420 are vertically displayed.

An electronic device according to various embodiments may include a sensor, a display, and a processor operatively connected, directly or indirectly, to the sensor and the display, wherein the processor may be configured to determine the feature of the context included in a UI component on the basis of an analysis result of the user interface (UI) component, determine the display direction of contents displayed on the display on the basis of the feature of the context and the posture of the electronic device, identify the rotation angle of the electronic device through the sensor in accordance with the posture change of the electronic device in a state in which the contents are displayed on the display, and change the display direction of the contents on the basis of identifying that the rotation angle is equal to or greater than the first value. The first value may be configured differently in accordance with the feature of the context.

According to an embodiment, the processor may determine the feature of the context on a package name on the context and the package name may be determined during development of an application including the context.

According to an embodiment, the processor may determine that the contents displayed on the display have the horizontal usability by being mainly displayed in the horizontal direction on the basis of at least one component on the electronic device being used.

According to an embodiment, at least one component on the electronic device may include at least one of a codec, a camera, a navigation, a GPS, and an inertial sensor.

According to an embodiment, the processor may determine the feature of the context on the basis of the refresh rate of the display.

According to an embodiment, the processor may determine that the contents displayed on the display have horizontal usability in which the contents displayed on the display are mainly displayed in a horizontal direction in response to the refresh rate of the display exceeding a preconfigured first level.

According to an embodiment, the processor may determine that the contents displayed on the display have vertical usability in which the contents displayed on the display are mainly displayed in a vertical direction in response to the refresh rate of the display being less than a preconfigured first level.

According to an embodiment, the processor may control the automatic rotation of the displayed content to occur at relatively low frequency by configuring the first value relatively high in the case that the contents displayed on the display are horizontally displayed compared with the case where the contents displayed on the display are vertically displayed in response to determining that the contents displayed on the display have the horizontal usability by being mainly displayed in the horizontal direction, and control the automatic rotation of the displayed content to occur at relatively high frequency by configuring the first value relatively low in the case that the contents displayed on the display are vertically displayed compared with the case where the contents displayed on the display are horizontally displayed.

According to an embodiment, the processor may control the automatic rotation of the displayed content to occur at relatively low frequency by configuring the first value relatively high in the case that the contents displayed on the display are vertically displayed compared with the case where the contents displayed on the display are horizontally displayed in response to determining that the contents displayed on the display have the vertical usability by being mainly displayed in the vertical direction, and control the automatic rotation of the displayed content to occur at relatively high frequency by configuring the first value relatively low in the case that the contents displayed on the display are horizontally displayed compared with the case where the contents displayed on the display are vertically displayed.

The screen display method of the electronic device according to various embodiments may include an operation of determining the feature of the context included in a UI component on the basis of an analysis result of the UI component, an operation of determining the display direction of the contents displayed on the display on the basis of the feature of the context and the posture of the electronic device, an operation of identifying the rotation angle of the electronic device through the sensor in accordance with the posture change of the electronic device in a state in which the contents are displayed on the display, and an operation of changing the display direction of the contents on the basis of identifying that the rotation angle is greater than the first value. The first value may be configured differently in accordance with the feature of the context.

According to an embodiment, the operation of determining the feature of the context included in a UI component on the basis of an analysis result of the UI component may further include determining the main usability attribute of the context on the basis of the refresh rate of the display.

According to an embodiment, an operation of changing the display direction of the contents on the basis of identifying that the rotation angle is equal to or greater than the first value may further include an operation of controlling the automatic rotation of the displayed content to occur at relatively low frequency by configuring the first value relatively high in the case that the contents displayed on the display are horizontally displayed compared with the case where the contents displayed on the display are vertically displayed in response to determining that the contents displayed on the display have the horizontal usability by being mainly displayed in the horizontal direction, and the operation of controlling the automatic rotation of the displayed content to occur at relatively high frequency by configuring the first value relatively low in the case that the contents displayed on the display are vertically displayed compared with the case where the contents displayed on the display are horizontally displayed.

According to an embodiment, an operation of changing the display direction of the contents on the basis of identifying that the rotation angle is equal to or greater than the first value may further include an operation of controlling the automatic rotation of the displayed content to occur at relatively low frequency by configuring the first value relatively high in the case that the contents displayed on the display are vertically displayed compared with the case where the contents displayed on the display are horizontally displayed in response to determining that the contents displayed on the display have the vertical usability by being mainly displayed in the vertical direction, and the operation of controlling the automatic rotation of the displayed content to occur at relatively high frequency by configuring the first value relatively low in the case that the contents displayed on the display are horizontally displayed compared with the case where the contents displayed on the display are vertically displayed.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a sensor;
a display; and
at least one processor, comprising processor circuitry, that is operatively connected to the sensor and the display, wherein the at least one processor is configured, individually and/or collectively, to:
determine a feature of a context included in a user interface (UI) component based on an analysis result of the UI component,
wherein the analysis result is obtained by analyzing a layout of the UI component to determine whether contents displayed on the display comprise at least one of a text, an image or a video,
determine a display direction of the contents displayed on the display based on the feature of the context and a posture of the electronic device,
identify, via at least the sensor, a rotation angle of the electronic device based on a posture change of the electronic device in a state that the contents are displayed on the display, and
change the display direction of the contents based on identifying that the rotation angle is equal to or greater than a first value,
wherein the first value is configured differently based on the feature of the context.

2. The electronic device of claim 1, wherein the at least one processor is configured, individually and/or collectively, to determine the feature of the context based on a package name of the context and the package name is determined during development of an application including the context.

3. The electronic device of claim 1, wherein the at least one processor is configured, individually and/or collectively, to determine that the contents displayed on the display have horizontal usability in which the contents displayed on the display are mainly displayed in a horizontal direction based on at least one component of the electronic device.

4. The electronic device of claim 3, wherein the at least one component of the electronic device includes at least one of a codec, a camera, a navigation device, a GPS, and an inertial sensor.

5. The electronic device of claim 1, wherein the at least one processor is configured, individually and/or collectively, to determine the feature of the context based on a refresh rate of the display.

6. The electronic device of claim 5, wherein the at least one processor is configured, individually and/or collectively to determine that the contents displayed on the display have horizontal usability in which the contents displayed on the display are displayed in a horizontal direction in response to the refresh rate of the display exceeding a preset first level.

7. The electronic device of claim 5, wherein the at least one processor is configured, individually and/or collectively, to determine that the contents displayed on the display have vertical usability in which the contents displayed on the display are mainly displayed in a vertical direction in response to identifying that the refresh rate of the display is less than a preset first level.

8. The electronic device of claim 1, wherein the at least one processor is configured, individually and/or collectively,
to control automatic rotation of displayed content to occur at a low frequency at least by configuring the first value as a high value in a case that the contents displayed on the display are horizontally displayed compared with a case where the contents displayed on the display are vertically displayed in response to determining that the contents displayed on the display have horizontal usability by being displayed in a horizontal direction, and
to controls the automatic rotation of the displayed content to occur at a frequency higher than the low frequency by configuring the first value as a value lower than the high value in the case that the contents displayed on the display are vertically displayed compared with the case where the contents displayed on the display are horizontally displayed.

9. The electronic device of claim 1, wherein the at least one processor is configured, individually and/or collectively,
to control the automatic rotation of the displayed content to occur at a relatively low frequency by configuring the first value as a high value in a case that the contents displayed on the display are vertically displayed compared with a case where the contents displayed on the display are horizontally displayed in response to determining that the contents displayed on the display have vertical usability by being mainly displayed in the vertical direction, and
to control the automatic rotation of the displayed content to occur at a frequency higher than the low frequency by configuring the first value to be a value lower than the high value in the case that the contents displayed on the display are horizontally displayed compared with the case where the contents displayed on the display are vertically displayed.

10. An electronic device comprising:
a hinge module comprising a hinge;
a first housing connected to the hinge module and includes a first surface, a second surface facing a direction opposite to the first surface, and a first side surface at least partially surrounding a first space between at least the first surface and the second surface;
a second housing connected to the hinge module so that folding is possible with respect to the first housing, and wherein the second housing includes, in an unfolded state, a third surface facing the same direction as the first surface, a fourth surface facing the opposite direction to the third surface, and a second side surface at least partially surrounding a space between at least the third surface and the fourth surface;
a first display disposed from at least a portion of the first surface to at least a portion of the third surface;
a second display viewable through at least a portion of the fourth surface in a second space;
a first sensor that is disposed in at least a portion of the first space and is configured to collect sensor data with respect to movement of the first housing;
a second sensor that is disposed in at least a portion of the second space and is configured to collect sensor data with respect to movement of the second housing; and
at least one processor, comprising processor circuitry, that is operatively connected to the first display, the second display, the first sensor, and the second sensor,
wherein the at least one processor is configured, individually and/or collectively, to:
determine a feature of a context included in a user interface (UI) component based on an analysis result of the UI component,
wherein the analysis result is obtained by analyzing a layout of the UI component to determine whether contents displayed on the display comprise at least one of a text, an image or a video,
determine a display direction of the contents displayed on a display based on the feature of the context and a posture of the electronic device,
identify a rotation angle of the electronic device based on a posture change of the electronic device through at least one of the first sensor or the second sensor in a state that the contents are displayed in at least one of the first display or the second display, and
change the display direction of the contents based on identifying that the rotation angle is equal to or greater than a first value,
wherein the first value is configured differently based on the feature of the context.

11. The electronic device of claim 10, wherein the at least one processor is configured, individually and/or collectively, to determine the feature of the context based on a package name on the context and the package name determined during development of an application including the context.

12. The electronic device of claim 10, wherein the at least one processor is configured, individually and/or collectively, to determine that the contents displayed on at least one of the first display or the second display have horizontal usability by being displayed horizontally based on at least one component of the electronic device.

13. The electronic device of claim 12, wherein at least one component of the electronic device includes at least one of a codec, a camera, a navigation device, a GPS and an inertial sensor.

14. The electronic device of claim 10, wherein the at least one processor is configured, individually and/or collectively, to determine a main usability attribute of the context based on a refresh rate of at least one of the first display and the second display.

15. The electronic device of claim 10, wherein the at least one processor is configured, individually and/or collectively, to control automatic rotation of displayed content to occur at a low frequency at least by configuring the first value as a high value in a case that the contents displayed on the display are horizontally displayed compared with a case where the contents displayed on the display are vertically displayed in response to determining that the contents displayed on the display have horizontal usability by being displayed in a horizontal direction, and to controls the automatic rotation of the displayed content to occur at a frequency higher than the low frequency by configuring the first value as a value lower than the high value in the case that the contents displayed on the display are vertically displayed compared with the case where the contents displayed on the display are horizontally displayed.

16. The electronic device of claim 10, wherein the at least one processor is configured, individually and/or collectively, to control the automatic rotation of the displayed content to occur at a low frequency by configuring the first value as a high value in a case that the contents displayed on the display are vertically displayed compared with a case where the contents displayed on the display are horizontally displayed in response to determining that the contents displayed on the display have vertical usability by being displayed in the vertical direction, and to control the automatic rotation of the displayed content to occur at a frequency higher than the low frequency by configuring the first value to be a value lower than the high value in the case that the contents displayed on the display are horizontally displayed compared with the case where the contents displayed on the display are vertically displayed.

17. A method for displaying a screen of an electronic device, the method comprising:
   determining a feature of a context included in a user interface (UI) component based on an analysis result of the UI component;
   wherein the analysis result is obtained by analyzing a layout of the UI component to determine whether contents displayed on the display comprise at least one of a text, an image or a video;
   determining a display direction of the contents displayed on a display based on the feature of the context and a posture of the electronic device;
   identifying a rotation angle of the electronic device in accordance with a posture change of the electronic device through a sensor in a state that the contents are displayed on the display; and
   changing the display direction of the contents based on identifying that a rotation angle is equal to or greater than a first value,
   wherein the first value is configured differently in accordance with the feature of the context.

18. The method of claim 17, wherein determining the feature of the context included in the UI component based on the analysis result of the UI component further comprises determining a usability of the context based on a refresh rate of the display.

19. The method of claim 17, wherein changing the display direction of the contents on the basis of identifying that the rotation angle is equal to or greater than the first value further comprises:
   controlling automatic rotation of the displayed content to occur at low frequency by setting the first value to a high value in a case that the contents displayed on the display are horizontally displayed compared with a case where the contents displayed on the display are vertically displayed in response to determining that the contents displayed on the display have horizontal usability by being displayed in the horizontal direction; and
   controlling the automatic rotation of the displayed content to occur at a frequency higher than the low frequency by setting the first value relatively to a value lower than the high value in the case that the contents displayed on the display are vertically displayed compared with the case where the contents displayed on the display are horizontally displayed.

20. The method of claim 17, wherein changing the display direction of the contents on the basis of identifying that the rotation angle is equal to or greater than the first value further comprises:
   controlling automatic rotation of the displayed content to occur at a low frequency by configuring the first value to a high value in a case that the contents displayed on the display are vertically displayed compared with a case where the contents displayed on the display are horizontally displayed in response to determining that the contents displayed on the display have vertical usability by being displayed in the vertical direction; and
   controlling the automatic rotation of the displayed content to occur at a frequency higher than the low frequency by configuring the first value to a value lower than the high value in the case that the contents displayed on the display are horizontally displayed compared with the case where the contents displayed on the display are vertically displayed.

* * * * *